United States Patent [19]
Mihara et al.

[11] Patent Number: 5,506,716
[45] Date of Patent: Apr. 9, 1996

[54] METHOD, CIRCUIT, AND APPARATUS FOR MITIGATING EFFECTS OF WAVELENGTH-DEPENDENT ATMOSPHERIC TRANSMISSION CHARACTERISTICS ON ATMOSPHERIC OPTICAL TELECOMMUNICATION

[75] Inventors: Kanji Mihara; Akira Hirashima; Takashi Otobe; Yujiro Ito, all of Kanagawa, Japan

[73] Assignee: Sony Corporation, Japan

[21] Appl. No.: 361,644

[22] Filed: Dec. 22, 1994

[30] Foreign Application Priority Data

Dec. 29, 1993 [JP] Japan .................................. 5-353409
May 31, 1994 [JP] Japan .................................. 6-119335

[51] Int. Cl.$^6$ ........................................... H04B 10/00
[52] U.S. Cl. ........................... 359/152; 359/161; 359/159
[58] Field of Search .......................... 359/143, 152–153, 359/161, 159, 172

[56] References Cited

U.S. PATENT DOCUMENTS

| | | | |
|---|---|---|---|
| 4,662,004 | 4/1987 | Fredriksen et al. | 455/607 |
| 4,691,385 | 9/1987 | Tipman | 359/152 |
| 5,206,697 | 4/1993 | Schwartz | 356/5 |
| 5,221,985 | 6/1993 | Ito | 359/154 |
| 5,329,395 | 7/1994 | Endo et al. | 359/159 |
| 5,424,860 | 6/1995 | Mihara | 359/152 |

*Primary Examiner*—Leo Boudreau
*Assistant Examiner*—Kinfe-Michael Negash
*Attorney, Agent, or Firm*—Limbach & Limbach; Charles P. Sammut

[57] ABSTRACT

A method, circuit, and apparatus for mitigating effects of wavelength-dependent atmospheric transmission characteristics on an atmospheric optical telecommunication system. The system comprises two atmospheric optical telecommunication units communicating with one another using light propagated through the atmosphere. Each of the atmospheric telecommunication units includes an optical transmitter having a laser generating a transmitted light beam for reception by the other, and an optical receiver. The optical receiver generates an electrical signal in response to a received light beam received from the other of the atmospheric optical telecommunication units. In the method, an increase in noise above a normal noise level is detected in the electrical signal, and a flag signal is generated in response. The increase in noise is due to the received light beam having a wavelength at which the atmosphere has a wavelength-dependent transmission characteristic. In response to the flag signal, the wavelength of the transmitted light beam is changed to a wavelength at which the transmission characteristic of the atmosphere is less wavelength-dependent.

37 Claims, 16 Drawing Sheets

METHOD, CIRCUIT, AND APPARATUS FOR MITIGATING EFFECTS OF WAVELENGTH-DEPENDENT ATMOSPHERIC TRANSMISSION CHARACTERISTICS ON ATMOSPHERIC OPTICAL TELECOMMUNICATION

FIELD OF THE INVENTION

This invention relates to a atmospheric optical telecommunication system in which an information signal is transmitted from one atmospheric optical telecommunication apparatus to another atmospheric optical telecommunication apparatus via a light beam propagated through the atmosphere.

BACKGROUND OF THE INVENTION

Up to now, in an atmospheric optical telecommunication system in which an information signal is transmitted frown an atmospheric optical telecommunication apparatus for reception by another atmospheric optical telecommunication apparatus via a light beam propagated through the atmosphere, especially when a laser is used as the light source, the laser light is transmitted from one of the atmospheric optical telecommunication apparatus after modulation in accordance with the information signal. The modulated laser light is received by the other atmospheric optical telecommunication apparatus and is demodulated to recover the information signal. In this way, the information signal is transmitted from one atmospheric optical telecommunication apparatus to another.

FIG. 1 illustrates bidirectional optical communication by laser light between the atmospheric optical telecommunication apparatus 81 and the atmospheric optical telecommunication apparatus 82 forming an atmospheric optical telecommunication system. Communication is achieved by the atmospheric optical telecommunication apparatus 81 or 82 transmitting a laser light via the lens 83 and by the atmospheric optical telecommunication apparatus 82 or 81 receiving the transmitted laser light via the lens 83. In the example shown, each of the atmospheric optical telecommunication apparatus includes an optical transmitter including a laser light source, and an optical receiver.

In an atmospheric optical telecommunication system employing a laser diode as the light source, a wavelength longer than 820 nm, for example, is used as the wavelength of the laser light. However, when wavelength multiplexing is used, the wavelength of the laser light may sometimes be shorter than 820 nm.

In atmospheric optical telecommunication systems for long-distance optical communication using a laser as the light source, changes in the properties of the atmospheric air that serves as the transmission medium result in variations in the carrier-to-noise ratio (C/N ratio) during signal transmission. The variations in the C/N ratio caused by the atmospheric air have up to now been thought to be produced by attenuation mainly caused by scattering, and by beam dancing caused by thermal fluctuations in the refractive index of the air.

The inventors have conducted experiments and have identified other noise-increasing factors in addition to scattering and beam dancing. These additional noise-increasing factors cause a marked increase in noise caused by atmospheric air, especially during long-distance transmission.

The first noise-increasing factor identified by the inventors' experiments is variations in the wavelength-dependent absorption caused by trace molecules in the atmosphere.

FIG. 2 shows the absorption spectrum of atmospheric air in the wavelength range of 770.0 nm to 841.6 nm, and shows that there are narrow absorption peaks in atmospheric air at a fairly large number of wavelengths in the wavelength range of 780 to 830 nm, which covers the most frequently used operating wavelengths of atmospheric optical telecommunication systems.

FIG. 3 illustrates the mechanism by which wavelength-dependent atmospheric absorption reduces the C/N ratio at the optical receiver. In the optical transmitter of the atmospheric optical telecommunication apparatus, a laser oscillating at a single frequency, such as a semiconductor laser operating in a single longitudinal mode, is used as the light source. The wavelength of the light generated by the laser can vary as a result of the temperature characteristics of the laser. If the wavelength of light generated by the semiconductor laser becomes coincident with one of the absorption lines in the wavelength absorption spectrum of atmospheric air as a result of the laser frequency shifting, the light power received by the optical receiver is reduced as a result of this atmospheric absorption, and the C/N ratio at the receiver is reduced. However, it has however been confirmed that, in long-distance atmospheric optical communication, an induced increase in noise occurs that far surpasses the deterioration in the C/N ratio resulting from the reduction in light power caused by absorption. Since the transmitted signal is attenuated by absorption, the C/N ratio of received signal is significantly worsened by synergistic effects.

Noise resulting from wavelength-dependent atmospheric absorption will from now on be called wavelength absorption noise. Wavelength absorption noise is usually produced as a result of wavelength shifting caused by the temperature characteristics of the laser. Thus, as the wavelength of the light generated by the laser changes relative to the wavelength of the atmospheric absorption peak, the wavelength absorption noise measured at the optical receiver gradually increases to a maximum level, and then decreases back to a normal level, as the temperature of the semiconductor laser in the transmitter increases. Since the wavelength absorption noise is caused by absorption by trace molecules in the atmosphere, its influence increases exponentially with increase of the transmitted distance.

It is thought that wavelength absorption noise is produced by the following two mechanisms. First, the laser frequency fluctuates slightly due to, for example, intensity modulation of the laser (this is generally termed "chirping"). Wavelength absorption noise is also slightly changed by the temperature characteristics or temporal changes of the laser oscillator. Thus, if the wavelength of the light generated by the laser overlaps the shoulder of one of the many wavelength-dependent absorption peaks in the atmosphere, as shown in FIG. 3, the shoulder of the adsorption peak translates the fluctuations in the laser frequency into fluctuations in the intensity of the light received by the optical receiver. Since the fluctuations in the laser frequency occur over a broad range of frequencies, the frequencies of the resulting fluctuations in intensity overlap the frequencies of the information signals amplitude modulated on the light beam. Accordingly, when the wavelength of the light generated by the laser coincides with the shoulder of an absorption peak, fluctuations in the laser frequency manifest themselves as intensity noise in the optical receiver.

In FIG. 3, S indicates an exemplary wavelength-dependent absorption peak in the atmosphere. Also shown in FIG.

3 is the emission spectrum of the light generated by the laser in the optical transmitter. If the wavelength λ of the light generated by the laser is at the shoulder of the absorption peak S, where the atmospheric transmission factor decreases rapidly, and the wavelength of the laser light changes within a range of Δλ as a result of intensity modulation, and/or as a result of the temperature characteristics and/or temporal changes in the laser, the change Δλ in the wavelength λ causes fluctuations in the intensity of the light received by the optical receiver. These fluctuations manifest themselves as intensity noise in the optical receiver, and lead to a considerable deterioration in the C/N ratio at the optical receiver.

Specifically, if the wavelength of the light generated by the laser in the optical transmitter coincides with one of the wavelength-dependent absorption peaks of the atmosphere, where the atmospheric transmission factor changes rapidly with wavelength, the light generated by the laser and having the wavelength λ suffers a fixed loss, and the C/N ratio is lowered relatively insignificantly, so long as the wavelength of the light remains constant. However, if the wavelength of the light generated by the laser fluctuates due to temporal changes of the laser, these wavelength changes are translated into fluctuations in intensity by the wavelength-dependent characteristic of the absorption peak S shown in FIG. 3. These fluctuations in intensity manifest themselves at the optical receiver as intensity noise. For example, changes (Δλ) in the wavelength of the light generated by the laser as small as 0.1 Å can degrade the C/N ratio by, for example, 10 dB or more.

In addition, since the changes in the wavelength of the light generated by the laser have an extremely high frequency, the wavelength absorption noise produced by this mechanism has broad frequency characteristics, such as those of white noise in the range of 0 to 400 MHz or 0 to 500 MHz. As a result, as mentioned above, the wavelength absorption noise overlaps the frequency regions occupied by the carriers of the information signals amplitude modulated on the light beam.

The second mechanism producing wavelength absorption noise is thought to be mode distribution noise, which generally explained as follows. If a semiconductor laser is operated in a pseudo-single mode, the distribution of output power between the main oscillation mode and the subsidiary oscillation mode may vary dynamically shown in FIGS. 4A and 4B, even though the total light output power of the semiconductor laser remains constant. In the main oscillation mode, light having a wavelength of $\lambda_0$ is predominantly generated, as shown in FIG. 4A, whereas in the subsidiary oscillation mode, more light at wavelengths different from $\lambda_0$ is generated, as shown in FIG. 4B. Transition between the oscillation modes shown in FIGS. 4A and 4B occurs very abruptly. Mode shifting produces no noise if the transmission ratio of the light power emitted by the optical transmitter and the light power received by the optical receiver remains independent of frequency, as in the case of the optical fiber transmission or near-distance atmospheric optical telecommunication.

However, if only the light generated in one of the oscillation modes, such as the main oscillation mode, reaches the optical receiver, and the power of the light generated by the main oscillation mode constantly fluctuates, the signal recovered in the optical receiver based on the light generated by such mode will be replete with noise and will constantly fluctuate in level. Light generated by a laser that is subject to mode shifting and transmitted via the atmosphere will result in wavelength absorption noise. For example, if the light generated by the main oscillation mode is significantly attenuated by an atmospheric absorption peak operating as a wavelength-dependent filter, then only the light generated by the subsidiary oscillation modes will be received, and the intensity of the light received will fluctuate constantly.

Thus, it is thought that the second mechanism producing wavelength absorption noise is fluctuations in the light power distribution between the main and subsidiary oscillation modes which, when subject to wavelength-dependent filtering by an atmospheric absorption peak, directly manifest themselves as wavelength absorption noise.

Thus, the mechanisms by which wavelength absorption noise is generated are thought to be noise produced by subjecting changes in the frequency of the laser to a sharp atmospheric absorption peak, and/or mode distribution noise accompanying the fluctuations in the laser operating mode in conjunction with atmospheric absorption. However, the cause of this noise cannot always be identified precisely. The dynamic noise resulting from these mechanisms is called the wavelength absorption noise to distinguish this noise from a second noise increasing factor, which will now be described.

The absorption spectrum resulting from trace molecules in the air is already known. This absorption spectrum is described in, for example, ATTENUATION OF VISIBLE AND INFRARED RADIATION, CCIR, Rep. 833, 1982. However, the magnitude of this absorption is low, with a maximum in the order of a maximum of 3 dB when measured with a spectroscope having the resolution of approximately 1A over a distance of about 10 km in atmospheric air on a fine autumn day. Thus, the wavelength-dependent absorption characteristics of the atmosphere have not been regarded as an important factor in determining the performance of an atmospheric optical telecommunication system for ground use over a distance of 1 to 2 km. It has been thought that the probability of the light wavelength employed in an atmospheric optical telecommunication system falling in the absorption range is not high, so that the existence of such wavelength-dependent absorption has been disregarded with respect to atmospheric optical telecommunication systems. Even although the wavelength range of the light used in such systems substantially overlaps the wavelength range of the absorption spectrum, it has been assumed that there is always a small difference between the wavelength of the light generated by the laser and that of the absorption peaks in the absorption spectrum, so that atmospheric absorption would not unduly affect the light received by the optical receiver.

The present inventors have also confirmed that, if a laser operating in the plural modes described above is used as the light source in a long-distance atmospheric optical telecommunication system, steady-state noise is produced by the second factor producing the increase in noise. It is thought that this steady-state noise is a result of the laser operating in more than one oscillation mode. This noise is produced even if the distribution of light power between the different oscillation modes remains static.

Specifically, as shown in FIG. 5, in a long-distance atmospheric optical telecommunication system, the light beam BD, arriving at the optical receiver, is generally larger in diameter than the light receiving lens 83 of the optical receiver of the atmospheric optical telecommunication apparatus 81 or 82. In addition, in the plane of the light beam BD perpendicular to the optical axis, the light intensity changes spatially due to fluctuations in the refractive index of the atmosphere. This produces portions of different light intensity similar to interference fringes. Because of the dimensional relationship between the received light beam BD and the light receiving lens 83, the optical receiver receives only the bright portions bp (corresponding to the bright bands of interference fringes) among the light portions of different light intensities. In other words, the optical receiver receives only portions of the incident light beam (e.g., the bright portions bp). The location of the intensity variations in the incident light beam depends on the wavelength of the light, so that the optical receiver operates in effect as a wavelength filter. In FIG. 5, portions dp shown by hatching correspond to the dark bands of the interference fringes.

Since interference fringes are generally formed as a function of the wavelength of the light, it may occur that, even though the portions of the light beam BD received by the light-receiving lens of the optical receiver correspond to the bright portions bp of the interference fringes in the light generated by the main oscillation mode of the laser, those portions correspond to the dark portions dp of the interference fringes in the light generated by the subsidiary oscillation mode of the laser. In this case, a significant steady-state noise is observed, thereby worsening the C/N ratio of received signals.

The noise resulting from the noise generating mechanism just described will be called steady-state mode distribution noise, to distinguish it from the mode distribution noise caused by fluctuations in the laser oscillation wavelength thought to produce the wavelength absorption noise. The steady-state mode distribution noise is mainly observed when the laser is operated in a pseudo-single mode, intermediate between a completely single mode and a completely multiple mode. It is not observed when the laser is operated in a completely single mode, nor when the laser is operated in a completely multiple mode.

Structurally, semiconductor lasers are classified into gain waveguide lasers and refractive index waveguide lasers. Gain waveguide lasers operate in the pseudo-single mode, so that they are susceptible to the above-mentioned steady-state mode distribution noise. Refractive index waveguide lasers are usually operated in the single mode, but will occasionally produce steady-state mode distribution noise when operated at a low output power, or due to mode competition (a transient unstable state produced at the time of transition from one output state to another).

The third factor responsible for increased noise is noise due to the above-mentioned first or second factors induced by the return light. Specifically, since the light beam arriving at the optical receiver in an atmospheric optical telecommunication system constantly fluctuates, the return light reflected back from the lens surface or the surface of the light-receiving device of the optical receiver is subject to constant significant changes in intensity. In a semiconductor laser, the longitudinal oscillation mode may undergo skipping, or the laser may operate in plural modes, as a result of the presence of the return light.

As a result, in an atmospheric optical telecommunication system in which the state of the return light constantly changes, a semiconductor laser that is susceptible to the influence of the return light cannot maintain its stable single-mode oscillation, but undergoes mode competition or mode hopping frequently. Mode competition leads to the mode distribution noise as mentioned above. In addition, if one of the competing modes coincides with one of the absorption peaks in the atmosphere, wavelength absorption noise will be produced. Return light tends to produce wavelength absorption noise due to abrupt mode hopping, and hence is observed as being an unstable state in which noise is produced in intermittent bursts.

The inventors have confirmed that the above-mentioned noise increasing factors occasionally lead to a noise increase that is so severe that it can cause a total failure of a long-distance atmospheric optical communication.

In a conventional atmospheric optical telecommunication system, as described above. high-quality atmospheric optical communication may occasionally be impossible as result of the above-mentioned noise-increasing factors. However, it is desirable that high-quality atmospheric optical communication be feasible at all times. Thus, it is desirable to prevent the above-described noise increasing factors from resulting in an unacceptable increase in the noise level.

SUMMARY OF THE INVENTION

The present invention provides a method of mitigating effects of wavelength-dependent atmospheric transmission characteristics on an atmospheric optical telecommunication system. The system comprises two atmospheric optical telecommunication units communicating with one another using light propagated through the atmosphere. Each of the atmospheric telecommunication units includes an optical transmitter having a laser generating a transmitted light beam for reception by the other, and an optical receiver. The optical receiver generates an electrical signal in response to a received light beam received from the other of the atmospheric optical telecommunication units. In the method, an increase in noise above a normal noise level is detected in the electrical signal, and a flag signal is generated in response. The increase in noise is due to the received light beam having a wavelength at which the atmosphere has a wavelength-dependent transmission characteristic. In response to the flag signal, the wavelength of the transmitted light beam is changed to a wavelength at which the atmosphere has a less wavelength-dependent transmission characteristic.

The increase in noise may be detected and the wavelength of the transmitted light beam may be changed both in the same one of the atmospheric optical telecommunication units. Alternatively, the increase in noise may be detected in one of the atmospheric optical telecommunication units, the flag signal may be transmitted from the one of the atmospheric optical telecommunication units to the other, where it is received, and the wavelength of the transmitted light beam may be changed in the other of the atmospheric optical telecommunication units in response to the received flag signal.

The laser may be a laser diode, and the wavelength of the transmitted light beam may be changed by the operating temperature of the laser diode in response to the flag signal.

Temporal changes in the operating temperature of the laser to may be monitored to generate temporal temperature change information, and, when the operating temperature of the laser diode is changed, the direction of change of the operating temperature of the laser may be determined using the temporal temperature change information.

In addition to changing the operating temperature of the laser diode, or as an alternative, the DC bias current of the laser diode may be changed in response to the flag signal to change the wavelength of the transmitted light beam.

The laser may be a dye laser including an optical resonator, in which case, the wavelength of the transmitted light beam may be changed by retuning the optical resonator in response to the flag signal.

Data representing wavelength-dependent atmospheric transmission characteristics may be stored in the atmospheric optical telecommunication units, and the wavelength of the transmitted light beam may be changed by reading the data representing wavelength-dependent atmospheric transmission characteristics in response to the flag signal, and changing the wavelength of the transmitted light beam by an amount determined by the data representing wavelength-dependent atmospheric transmission characteristics.

The received light beam may be modulated with an information signal having a carrier frequency, in which case, the increase in noise is detected by measuring a level in the electrical signal at a frequency below the carrier frequency.

The invention also provides a circuit for use in an atmospheric optical telecommunication unit for mitigating effects of wavelength-dependent atmospheric transmission characteristics when the atmospheric optical telecommunication is used together with another atmospheric optical telecommunication unit to form an atmospheric optical telecommunication system in which the atmospheric optical telecommunication units communicate with one another using light propagated through the atmosphere. The atmospheric telecommunication unit includes an optical transmitter and an optical receiver. The optical transmitter includes a laser generating a transmitted light beam for reception by the other atmospheric optical telecommunications unit. The optical receiver generates an electrical signal in response to a received light beam received from the other atmospheric optical telecommunication unit. The circuit comprises a detecting section and a wavelength changing section. The detecting section detects an increase in noise above a normal noise level in the electrical signal and generates a flag signal in response. The increase in noise is due to the received light beam having a wavelength at which the atmosphere has a wavelength-dependent transmission characteristic. The wavelength changing section operates in response to the flag signal to change the wavelength of the transmitted light beam to a wavelength at which the transmission characteristic of the atmosphere is less wavelength-dependent.

The circuit may additionally include a modulator and a demodulator. The modulator operates in response to the flag signal to modulate the laser with a first signal component to transmit the flag signal. The demodulator extracts a second signal component from the electrical signal, and the wavelength changing section operates in response to the second signal component from the demodulator in lieu of the flag signal.

When the laser is a laser diode, the wavelength changing section may include a device that changes the operating temperature of the laser diode in response to the flag signal. Additionally or alternatively, the wavelength changing section may include a circuit that changes the DC bias current of the laser diode may be changed. When the laser is a dye laser, the circuit may include an element that re-tunes the optical resonator of the dye laser in response to the flag signal.

Finally, the invention provides an atmospheric optical telecommunication apparatus for use in a atmospheric optical telecommunication system in which the atmospheric optical telecommunication apparatus and another atmospheric optical telecommunication apparatus communicate with one another using light propagated through the atmosphere. The atmospheric optical telecommunication apparatus has a reduced susceptibility to effects arising from wavelength-dependent atmospheric transmission characteristics. The apparatus comprises an optical transmitter, an optical receiver, a detector, and a wavelength changer. The optical receiver includes a laser means that generates a transmitted light beam for reception by the other of the atmospheric optical telecommunications unit. The optical receiver generates an electrical signal in response to a received light beam received from the other atmospheric optical telecommunication unit. The detector detects an increase in noise above a normal noise level in the electrical signal generated by the optical receiver, and generates a flag signal in response. The increase in noise is due to the received light beam having a wavelength at which the atmosphere has a wavelength-dependent transmission characteristic. The wavelength changer operates in response to the flag signal to change the wavelength of the transmitted light beam to a wavelength at which the transmission characteristic of the atmosphere is less wavelength-dependent.

The apparatus may additionally comprise a modulator and a demodulator. The modulator operates in response to the flag signal to modulate the laser with a first signal component to transmit the flag signal, and the demodulator extracts a second signal component from the electrical signal. In this case, the wavelength changer means operates in response to the second signal component from the demodulator in lieu of the flag signal.

When the laser is a laser diode, the wavelength changer may include a device that changes the operating temperature of the laser diode in response to the flag signal. Additionally or alternatively, the wavelength changer may include a circuit that changes the DC bias current of the laser diode. When the laser is a dye laser, the wavelength changer may include a device that re-tunes the optical resonator of the dye laser in response to the flag signal.

DETAILED DESCRIPTION OF THE INVENTION

Preferred embodiments of the present invention will now be described in detail with reference to the drawings.

Figure 6A:
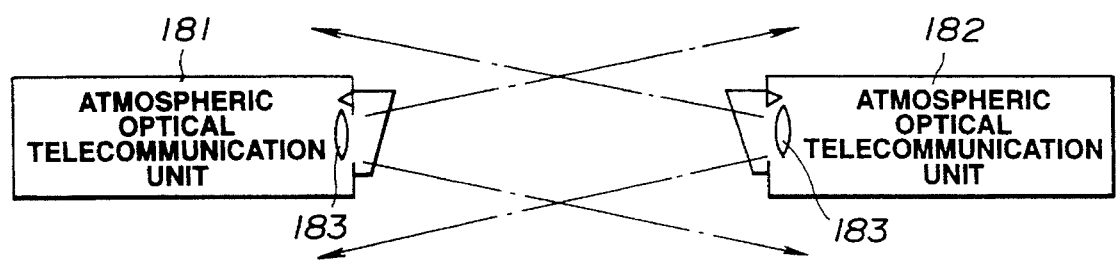
FIG. 6A illustrates an atmospheric optical communication system between two atmospheric optical telecommunication units according to the invention.

The atmospheric optical telecommunication apparatus according to the present embodiment is used in the bidirectional atmospheric optical telecommunication system shown in FIG. 6A. FIG. 6A illustrates bidirectional optical communication by laser light between the atmospheric optical telecommunication apparatus according to the invention 181 and the atmospheric optical telecommunication apparatus according to the invention 182 forming an atmospheric optical telecommunication system. Communication is achieved by the atmospheric optical telecommunication apparatus 181 or 182 transmitting a laser light via the lens 183 and by the atmospheric optical telecommunication apparatus 182 or 181 receiving the transmitted laser light via the lens 183. In the system shown, each of the atmospheric optical telecommunication apparatus includes an optical transmitter including a laser light source, the frequency of which is controlled to reduce the ill effects of wavelength-dependent atmospheric absorption, and an optical receiver.

Figure 6B:
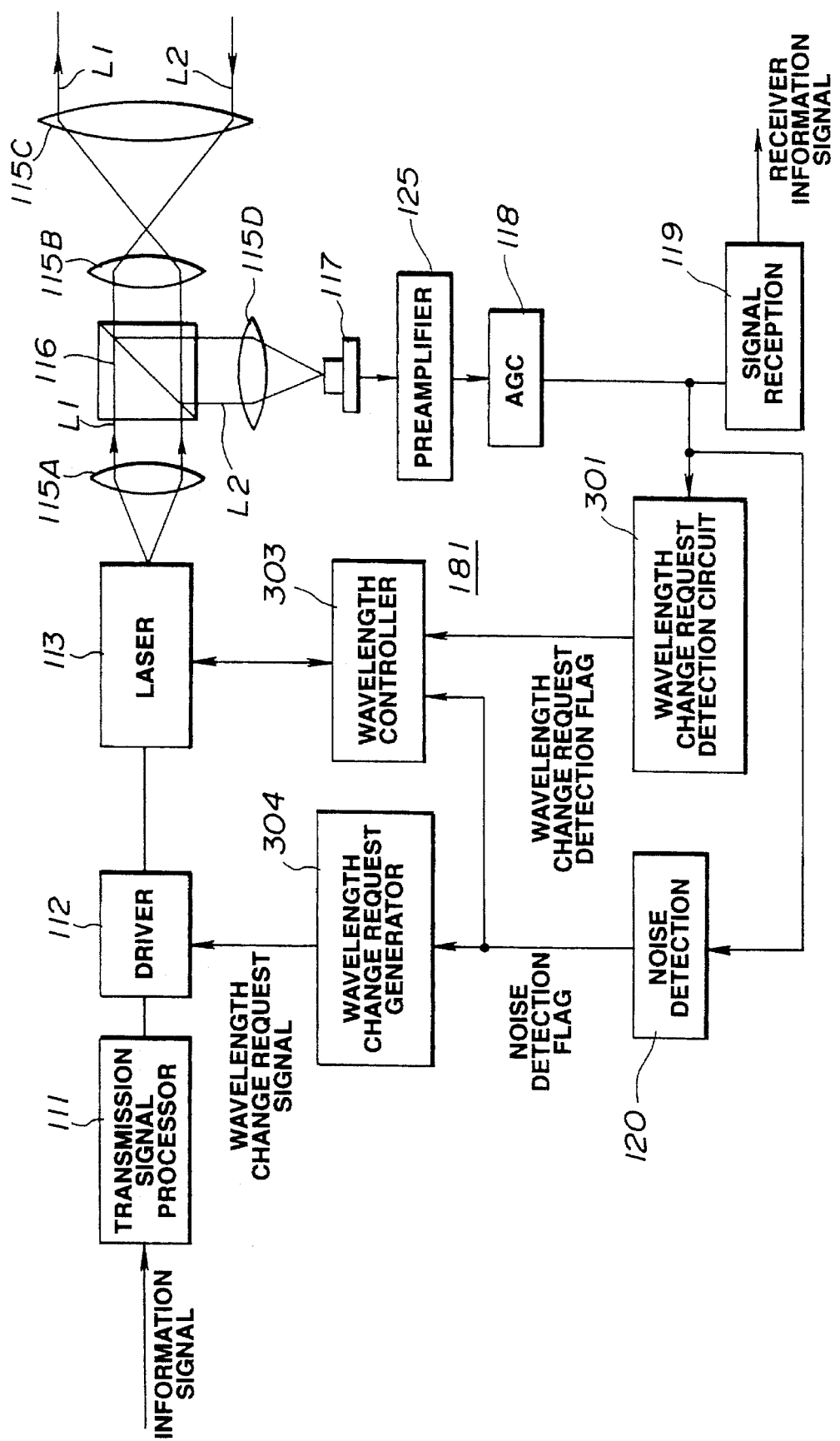
FIG. 6B is a schematic block diagram showing the arrangement of an atmospheric optical apparatus according to a first embodiment of the present invention.

The main components of the atmospheric optical telecommunication apparatus 181 of the present embodiment are shown in FIG. 6B. Although the construction of the atmospheric optical telecommunication apparatus 181 is shown, the atmospheric optical telecommunication apparatus 182 is constructed similarly.

Referring to FIG. 6B, in the optical transmitter of the atmospheric optical telecommunication apparatus 181, a transmission signal is generated by the transmission signal processor 111 in response to the information signal to be transmitted, which is, for example, a video signal. The transmission signal processor feeds the transmission signal to the driver 112, which drives the laser 113 to cause the laser to generate light modulated in accordance with the transmission signal.

Figure 1:
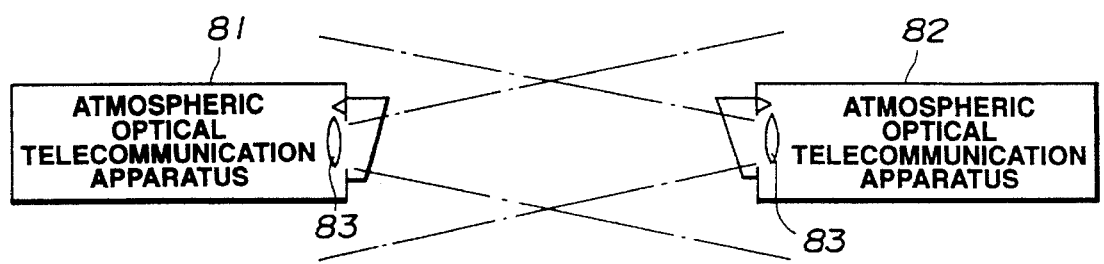
FIG. 1 illustrates an atmospheric optical communication system between two atmospheric optical telecommunication units.
Figure 2:
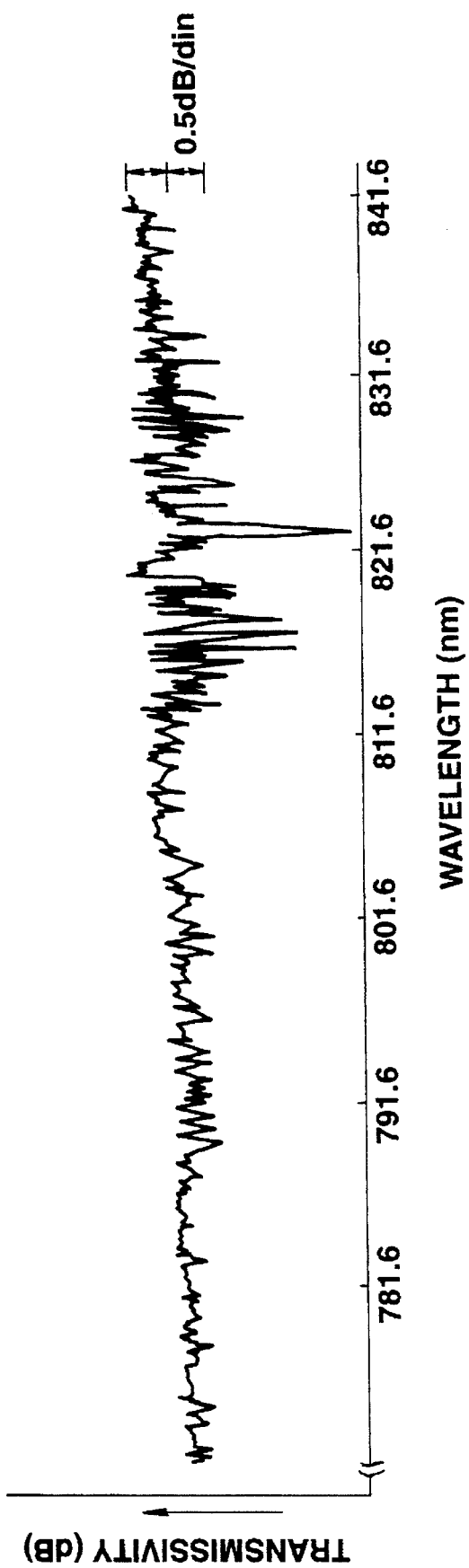
FIG. 2 illustrates the spectrum of sunlight after wavelength-dependent absorption by the atmosphere.
Figure 5:
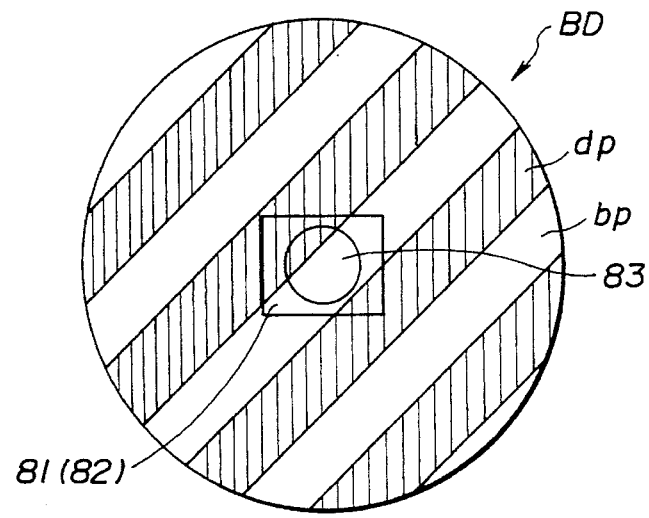
FIG. 5 illustrates the wavelength filtering effects produced by the receiving lens of an atmospheric optical telecommunication apparatus during long-distance atmospheric optical communication.

The light from the laser 113 is collimated by the lens 115A and passes through the polarized light beam splitter 116. The light, having a pre-set plane of polarization, passes through the lenses 115B and 115C, which further collimate the light and transmit the light in a narrow beam L1 through the atmosphere. The lens 115 corresponds to the lens 83 shown in FIGS. 1 and 5.

The optical receiver of the atmospheric optical telecommunication apparatus 181 receives the light beam from a remote transmitter via the lenses 115B and 115C and feeds the light beam to the polarized light beam splitter 116. The two atmospheric optical telecommunication apparatus 181 and 182 constituting an atmospheric optical telecommunication system are set up so that the plane of polarization of the light beam transmitted by each of the atmospheric optical telecommunication apparatus is orthogonal to the plane of polarization of the light beam transmitted by the other. Consequently, the light beam L2 received by the optical receiver shown in FIG. 6B is reflected by the reflecting surface of the polarized beam splitter 116, which feeds the light beam via the lens 115D to the photo-detector 117.

The lens 115D converges the received light beam L2 on the light receiving surface of the photo-detector 117, which is, for example, a photodiode. The photo-detector 117 receives the converged light beam L2 and converts it into an electrical signal. The electrical signal from the photo-detector 117 is amplified by the pre-amplifier 125 and is fed to the automatic gain control circuit (AGC circuit) 118. The electrical signal, gain-adjusted by the AGC circuit 118 to a pre-set level, is demodulated by the reception signal processing circuit 119 and the resulting information signal is fed to an output terminal.

To avoid noise resulting from the above-mentioned noise-increasing factors, the atmospheric optical telecommunication apparatus of the present embodiment includes the noise detection circuit 120. The noise detection circuit detects any deterioration of the carrier-to-noise ratio resulting from absorption of the light generated by the laser by trace components in the atmosphere. The apparatus also includes wavelength control circuitry, which changes the wavelength of the light generated by the laser to avoid the absorption peaks caused by trace components in the atmosphere.

The circuit elements that prevent the generation of noise by the above-mentioned noise-increasing factors in the atmospheric optical telecommunication apparatus of the present embodiment, and the manner of operation thereof, will now be described with reference to FIG. 6B. The present invention is aimed at reducing noise in long-distance transmission. Thus, the basic concept of the present invention is to determine whether or not the noise level in the received signal is greater than a pre-set level, and on the assumption that, if the noise exceeds the pre-set level, the noise has been generated and increased by the above-mentioned noise-increasing factors, to change the laser oscillation frequency. Changing the laser oscillation frequency changes the laser operating conditions to reduce the noise to below the pre-set level, or at least prevents the noise from increasing further.

Figure 7A:
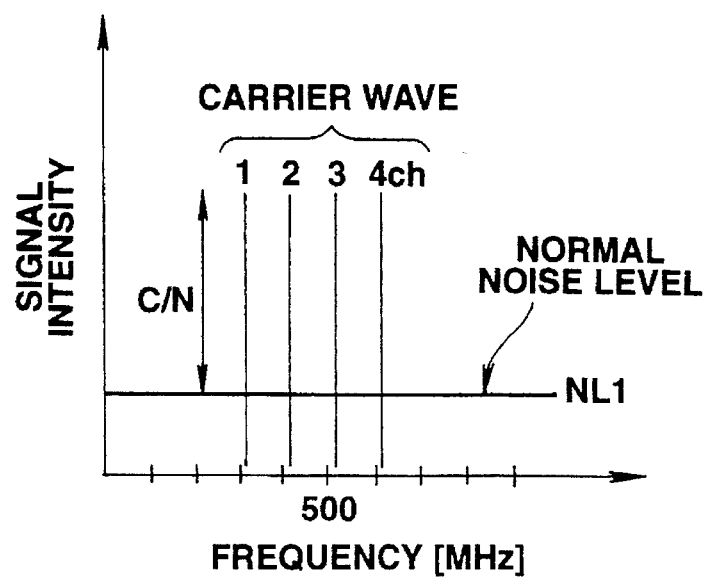
FIGS. 7A and 7B illustrate the way in which the noise increasing factors increase the noise during long-distance atmospheric optical communication.

As mentioned above, noise ascribable to the above-mentioned noise-increasing factors has a broad spectrum covering a frequency range in the order of 0 to 400 MHz or 500 MHz, as shown in FIG. 7A. Thus, by selecting a frequency or band of frequencies in the vicinity of, for example, 100 MHz, and in a region free of carrier waves (e.g., the carrier waves of the transmission channels ch1 to ch4 having the different frequencies shown in FIG. 7A), and by detecting the noise at the selected frequency or band of frequencies, the noise increase due to the above-mentioned noise-increasing factors can be determined. In the present embodiment, a frequency in the vicinity of, for example, 80 MHz, is employed as the frequency for detecting the noise increase due to the above-mentioned noise increasing factors. To provide a comparison, the noise level NL1 for normal transmission (i.e., transmission that is free of noise ascribable to the above-mentioned noise-increasing factors), and the ratio of the carrier level CL for each of the transmission channels ch1 to ch4 to the noise level NL1, are also shown in FIG. 7A.

Figure 7B:
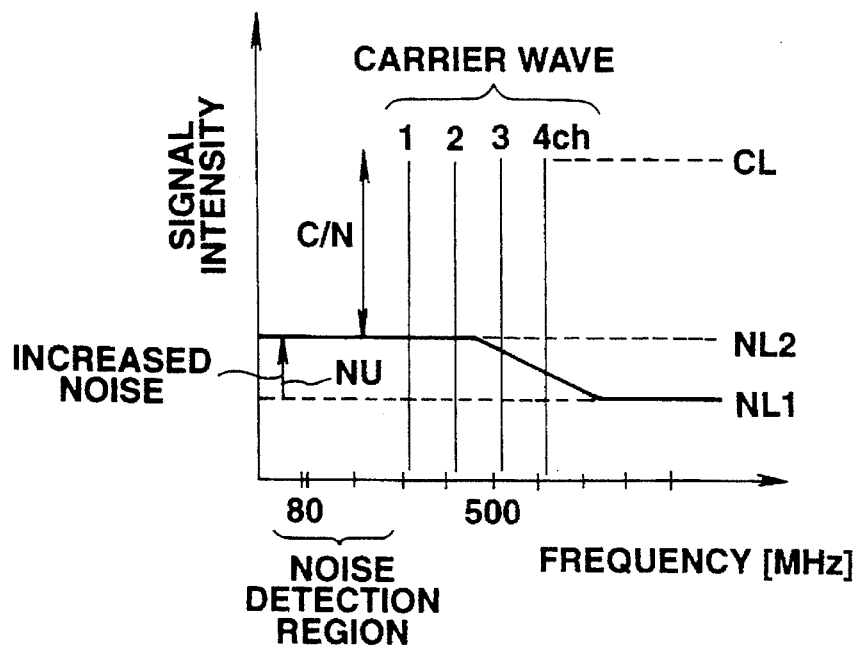

If the noise increases in level to a magnitude larger than the noise level NL1 for normal transmission shown in FIG. 7A, the noise level is increased, as shown by arrow NU in FIG. 7B, in the frequency range of 0 to 400 MHz or 500 MHz, to the noise level NL2. This lowers the carrier-to-noise (C/N) ratio of all the transmission channels. If the C/N ratio in the atmospheric optical telecommunication system is lowered in this manner, the S/N ratio of the received information signals is also lowered.

In the atmospheric optical telecommunication apparatus of the present embodiment, any lowering in the C/N ratio, and hence of the S/N ratio, as a result of wavelength-dependent atmospheric absorption as described above is detected by the noise detection circuit 120 shown in FIG. 6B. The arrangement of the noise detection circuit 120 will be described in detail with reference to FIGS. 6B and 8.

Figure 8:
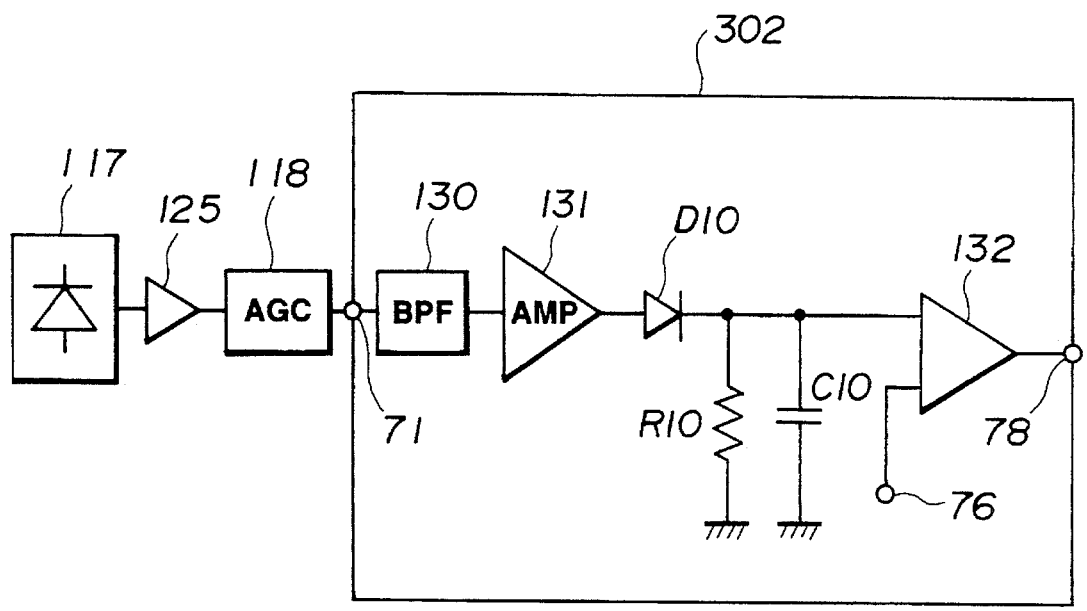
FIG. 8 is a circuit diagram illustrating the basic arrangement of the noise detection circuit in the atmospheric optical telecommunication apparatus according to the invention.

In FIGS. 6B and 8, the photo-detector 117, which is, for example, a photodiode, generates an electrical signal in response to the light beam received from the optical transmitter of the atmospheric optical telecommunication apparatus 182. The electrical signal from the photo-detector 117 is amplified by the pre-amplifier 125, the output of which is fed via the AGC circuit 118 to the terminal 71 of the noise detection circuit 120.

Details of the noise detection circuit are shown in FIG. 8. In the noise detection circuit, the electrical signal fed to the terminal 71 is supplied to the band-pass filter 130. The band-pass filter 130 passes signals only in the frequency range in the vicinity of, for example, 80 MHz, i.e., signals in the noise detection range shown in FIG. 7B. This frequency range is outside the carrier frequencies of the transmission channels ch1 to ch4 shown in FIG. 7B used for transmission and reception of the information signals in the atmospheric optical telecommunication system. A band-pass filter 130 which passes signals in a noise detection range of 50 to 150 MHz may alternatively be used.

The output of the band-pass filter 130 is amplified by the amplifier 131 to a level capable of stable diode detection by the diode D10. The amplifier 131 amplifies the signal by, for example, 20 dB, although an amplifier 131 capable of amplifying the signal by 60 dB may alternatively be used. The signal in the selected noise detection frequency range, amplified by the amplifier 131, is supplied to the anode terminal of the diode D10. Together with the resistor R10 and the capacitor C10, the diode D10 forms an AM rectifying detector. One end of each of the resistor R10 and the capacitor C10 is grounded, and the other end is connected to the cathode of the diode D10.

The output of the AM rectifying detector is fed to the input terminal of the comparator 132, the other input terminal of which is fed with the reference voltage Vr from the terminal 76. The comparator 132 compares the output of the AM rectifying detector with the reference voltage Vr to determine whether any rise in the background noise NU shown in FIG. 7B has occurred. The reference voltage Vr is the reference voltage used for detecting whether the signal level in the noise detecting range around 80 MHz (or between 50 MHz and 150 MHz) exceeds the above-mentioned normal transmission noise level NL1. The reference voltage Vr is set depending on the detection sensitivity required. However, the reference voltage Vr must be larger than the output of the AM rectifying detector corresponding to the normal transmission noise level NL1.

The output of the comparator 132 is fed to the output terminal 78 as the noise detection flag, and is fed to the wavelength control circuit 303 shown in FIG. 6B.

If a noise detecting frequency range around 80 MHz is used, adverse effects caused by the carrier frequencies used for transmission and reception of the information signals over the transmission channels ch1 to ch4 in the atmospheric optical telecommunication apparatus can be avoided. Additionally, adverse effects caused by, for example, television signals can be avoided.

Figure 9:
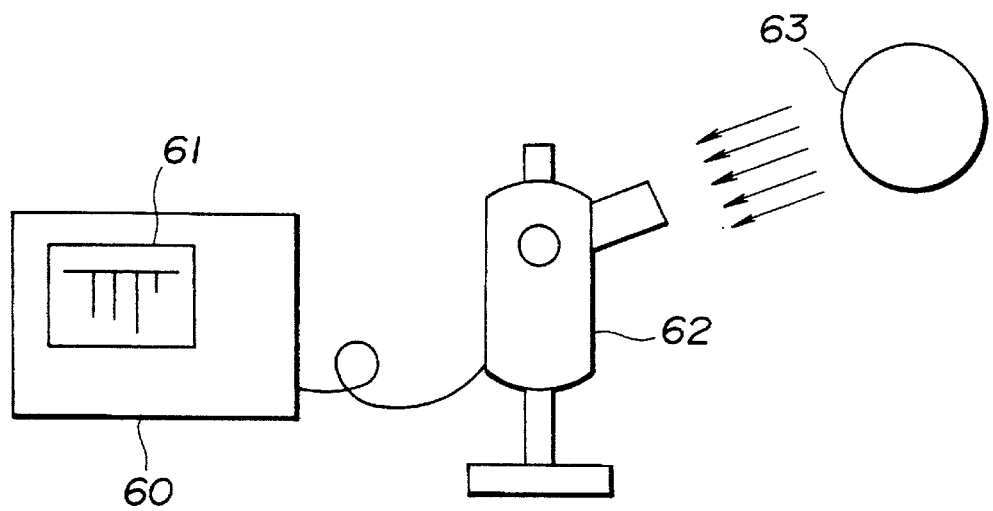
FIG. 9 illustrates an arrangement for measuring the atmospheric absorption spectrum.

On reception of the noise detection flag from the noise detection circuit 120, the wavelength control circuit 303 causes the frequency of the laser 113 to change by a predetermined magnitude in a predetermined direction. The predetermined magnitude and direction of the change in the laser oscillation frequency are determined by the method illustrated in FIG. 9.

First, the sun 63, which emits black body radiation having a continuous spectrum, is observed, through the atmosphere to check the manner of actual absorption by the atmosphere. Thus, to obtain data for use in controlling the wavelength of the light generated by the laser, light from a light source having a continuous spectrum, such as the sun 63, is received by the heliometer 62, and is separated into its spectral components by the spectroscope 60. The display section 61 of the spectroscope 60 displays an atmospheric absorption spectrum similar to that shown in FIG. 10.

Figure 10:
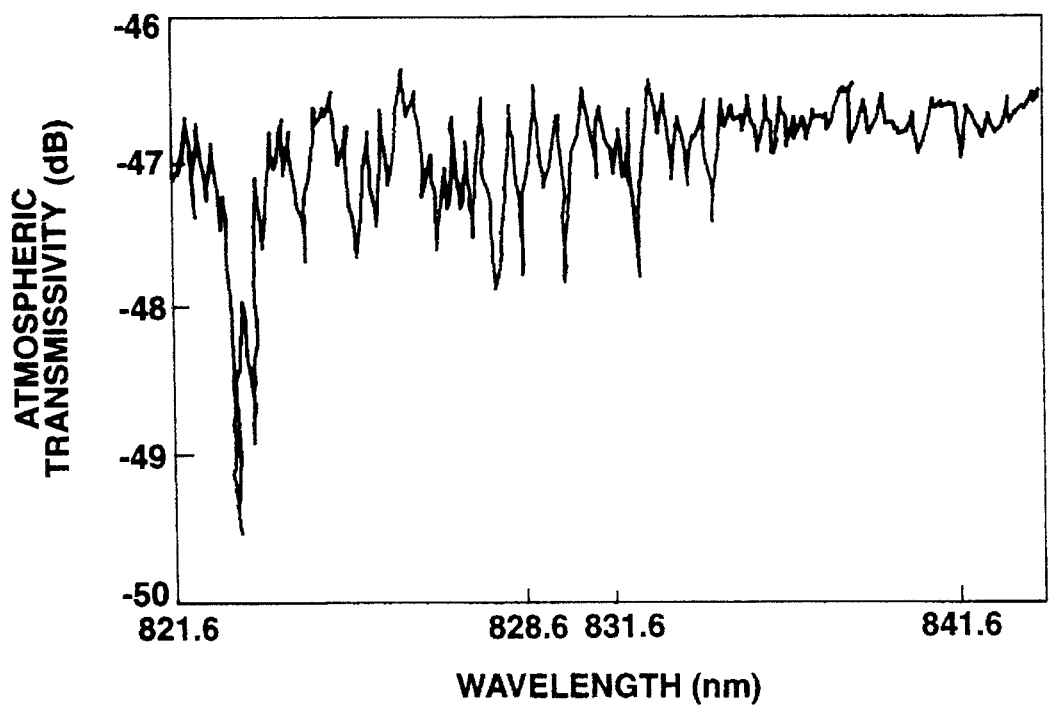
FIG. 10 shows a portion of the measured absorption spectrum.

Among the trace components in the atmosphere, carbon dioxide and water vapor cause the largest wavelength-dependent absorption effects on atmospheric optical telecommunication. In particular, absorption by water vapor can have significant effects when the light generated by the laser has a wavelength of 83 nm. Water vapor has a basic absorption spectrum K=1300 (1/cm)–1900 (1/cm), with the absorption at a frequency equal to 8 times the basic absorption spectrum being represented as 10000000/(8*K), these wavelengths being 962 nm–658 nm. FIG. 10 shows only the range of 821.6 nm–841.6 nm in the vicinity of the laser wavelength of 830 nm.

Figure 11:
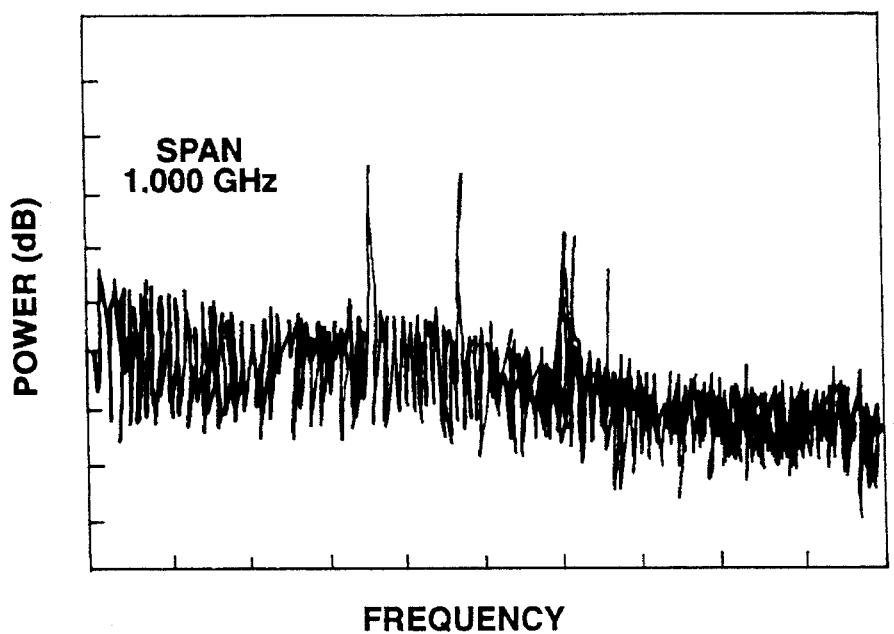
FIG. 11 shows the actually measured frequency of the measured absorption spectrum.
Figure 12A:
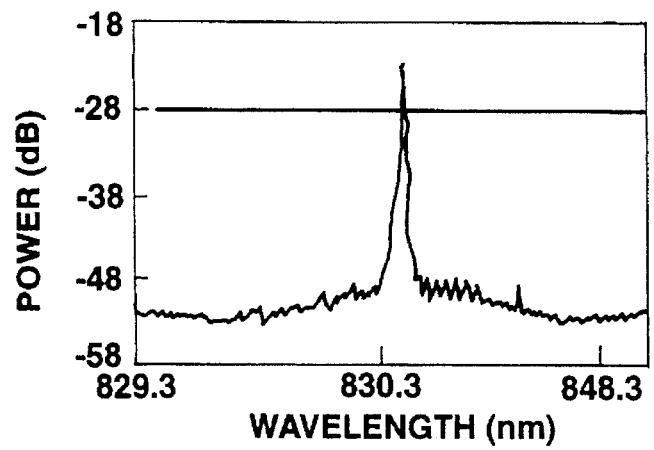
FIG. 12 shows the state of interference by the absorption spectrum.
Figure 12B:
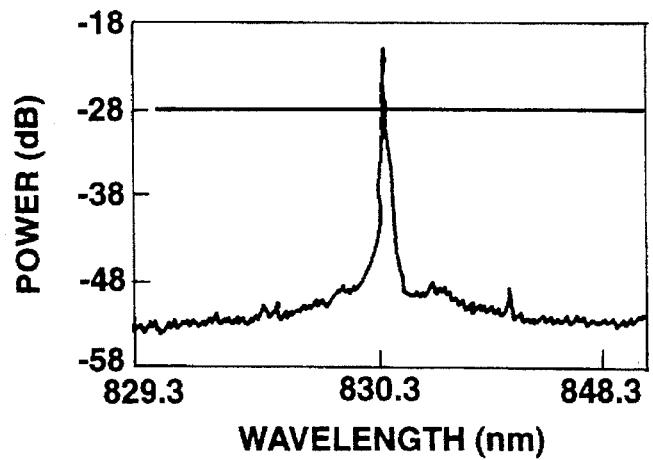
Figure 12C:
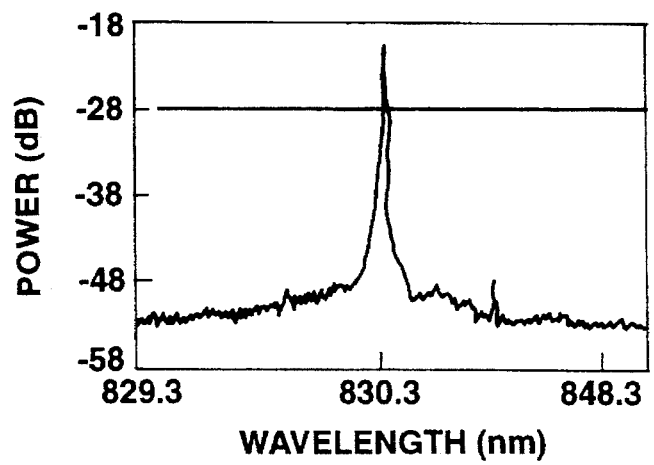

The effect of wavelength-dependent absorption caused by trace amounts of water vapor in the atmosphere on laser light at 830.12 nm is shown as an example in FIGS. 11 and 12A–12C. In these Figures, the information signal transmitted is a video signal. Thus, the actual measured values of the frequency are shown in FIG. 11, while the signal spectrum and the interference by the absorption spectrum are shown in FIGS. 12A–12C. In FIGS. 12A–12C, the S/N ratio of the video signal is set to approximately 50 dB, 55 dB and to 63 dB, respectively.

In the atmospheric optical telecommunication apparatus shown in FIG. 6B, information concerning the wavelength-dependent absorption by the trace components in the atmosphere, measured as described above, is stored in the internal memory of the central processing unit (CPU) 302 in the wavelength control circuit 303. On reception of the noise detection flag from the noise detection circuit 120, the wavelength control circuit 303 controls the laser oscillator 113 so that the laser will generate laser light of a wavelength that avoids the previously-measured absorption peaks. In this way, the light generated by the laser 113 is protected against the adverse effects of wavelength-dependent atmospheric absorption.

Although the above example has been described in connection with water vapor, the measurement method described above will also detect wavelength-dependent absorption by carbon dioxide and/or other trace components in the atmosphere. This information may also be stored in the internal memory in the wavelength control circuit so that adverse effects resulting from wavelength-dependent absorption by these other trace components may also be avoided.

Figure 13:
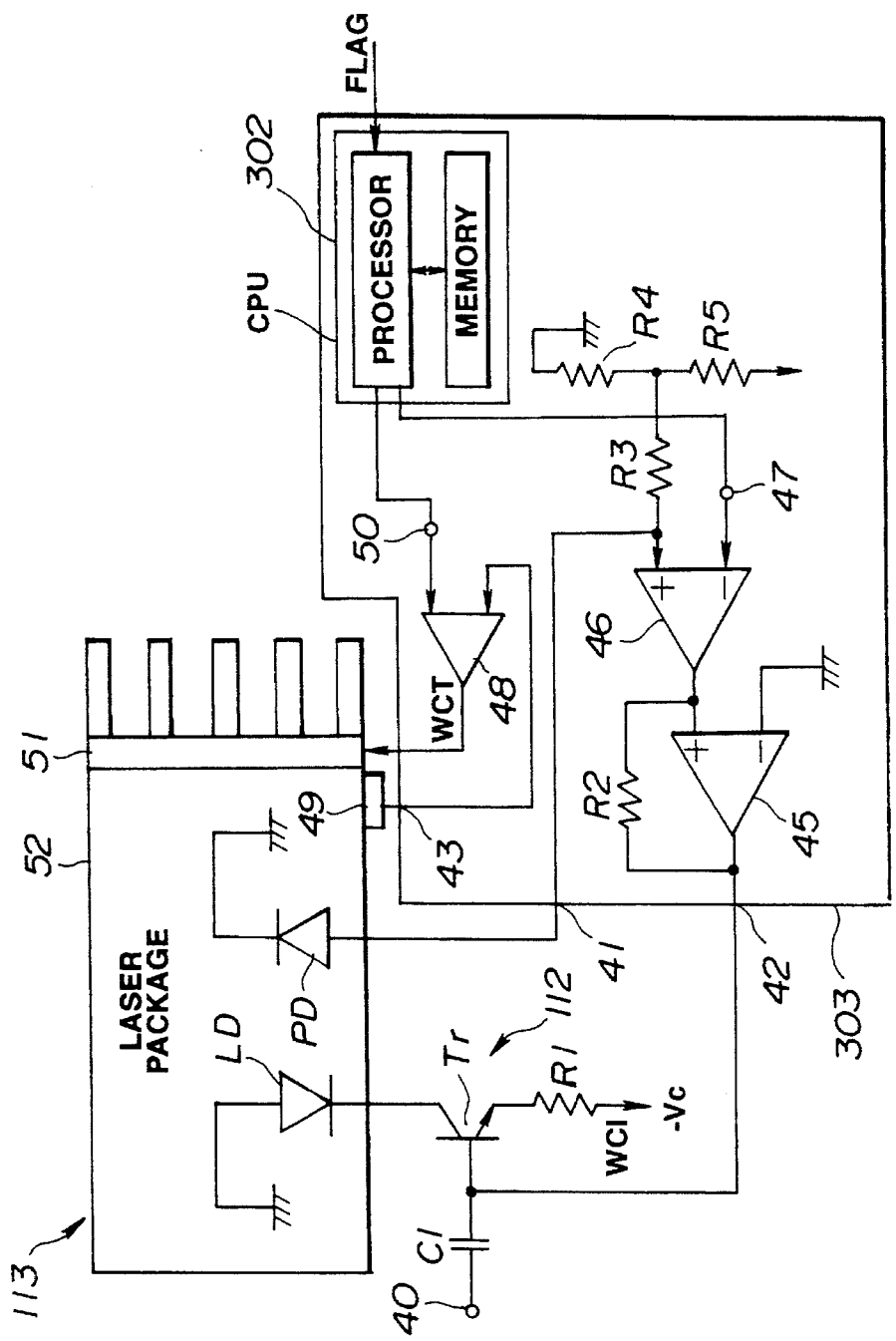
FIG. 13 shows a schematic arrangement of a laser diode as a practical example of a laser having adjustable frequency.

An arrangement for controlling the wavelength of the light generated by the laser 113 is shown in FIG. 13. FIG. 13 shows the internal structure of the laser 113 shown in FIG. 6B, and the structures of the driver 112 and the essential portions of the wavelength control circuit 303. In the arrangement shown in FIG. 13, the laser 113 is a semiconductor laser (laser diode). The laser 113 includes the laser package 52, which encloses the laser diode LD and the photodiode PD, which monitors the output power of the laser diode LD.

In the driver 112, the terminal 40 receives the transmission signal from the transmission signal processing circuit 111. The capacitor C1 couples the transmission signal from the input terminal 40 to the base of the NPN transistor Tr. The emitter of the transistor Tr is connected via the resistor R1 to the negative power supply −Vc. The laser diode LD is connected between the collector of the transistor Tr and ground. A DC biassing arrangement provided by the wavelength control circuit 303 establishes a DC bias current through the transistor Tr, and hence through the laser diode LD, which causes the laser diode to emit light of a controlled intensity. The DC bias current through the laser diode, and hence the light output of the semiconductor laser element, is modulated in accordance with the transmission signal received from the driver 112.

The photodiode PD mounted in the laser package 52 has its cathode terminal grounded and has its anode terminal connected to the input terminal 41 of the wavelength control circuit 303. The output of the photodiode PD is fed via the input terminal 41 to the input terminal of the comparator 46. The input terminal of the comparator 46 is also fed via the resistor R3 with a voltage obtained by dividing the negative power supply voltage by the voltage-dividing resistors R4 and R5. The other input terminal of the comparator 46 is fed with the reference voltage Vrp, which will be described below, received via the terminal 47.

The output of the comparator 46 is supplied to the inverting amplifier 45 provided with the feedback resistor R2. The output of the inverting amplifier 45 is connected to the base of the transistor Tr via the output terminal 42. The output voltage of the inverting amplifier 45 sets the DC base voltage of the transistor Tr, and hence sets the DC bias current through and light output of the laser diode LD. Various buffering resistors, such as those between the output of the comparator 46 and the inverting input of the inverting amplifier 45 and between the output of the inverting amplifier 45 and the base of the transistor Tr have been omitted from FIG. 13 to simplify the drawing.

The relation between the wavelength of the light generated by the laser diode LD and the DC bias current generated by the transistor Tr in response to the output of the inverting amplifier 45 is such that, with current values of 60 mA, 65 mA, 70 mA, 80 mA, 88 mA and 90 mA, the wavelength of the light is 829.4 nm, 829.5 nm, 829.5 nm, 829.6 nm, 832.2 nm and 832.3 nm, respectively. Thus, changing the DC bias current generated by the transistor Tr changes the wavelength of the light generated by the laser diode. Thus, the wavelength of the light generated by the laser may be changed by adjusting the DC bias current generated by the transistor Tr.

In the atmospheric optical telecommunication apparatus of the present embodiment, the wavelength of the light generated by the laser diode LD is changed by adjusting the DC bias current generated by the transistor Tr to drive the laser diode. The DC bias current can therefore be regarded as the control signal WCI generated by the wavelength control circuit 303 for controlling the wavelength of the light generated by the laser. The reference voltage Vrp for adjusting the DC bias current is generated in response to information on the atmospheric absorption spectrum maintained in the internal memory of the CPU 302.

If, in the atmospheric optical telecommunication apparatus of the present embodiment, the laser diode LD shown in FIG. 13 is used as the laser, the comparator 46 compares the reference voltage Vrp, generated on the basis of the information concerning the absorption spectrum by the trace components in the atmosphere maintained in the memory of the CPU 302 of the wavelength control circuit 303 with the detection voltage generated by the photodiode PD and, via the amplifier 45, sets the DC bias current generated by the transistor Tr to control the wavelength of the light generated by the laser in such a manner as to avoid adverse effects caused by wavelength-dependent atmospheric absorption.

Figure 14:
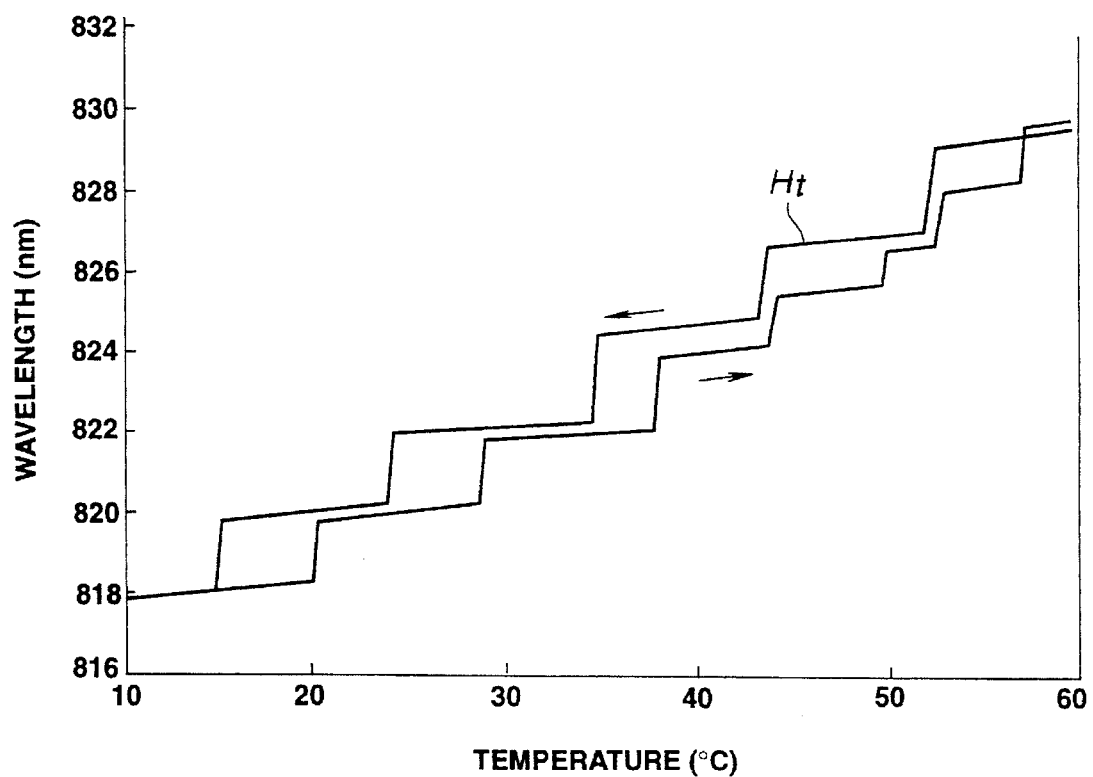
FIG. 14 shows the relation between temperature and the wavelength of the light generated by the laser diode.

As an additional or alternative way of controlling the wavelength of the light generated by the laser diode LD, the inventors' experiments show that if the light output of the laser diode LD is maintained at a constant value, the relationship between the temperature on or around the laser package 52 of the laser diode and the wavelength of the light generated by the laser diode has the hysteresis characteristic Ht shown in FIG. 14. As the temperature of the laser diode increases, the wavelength of the light generated increases, and as the temperature of the laser diode decreases, the wavelength of the light decreases. Mode hopping causes hysteresis as the temperature increases and decreases. In the example shown in FIG. 14, the wavelength of the light generated changes from approximately 818 nm to approximately 830 nm when the temperature changes from 10°–60° C.

Thus, adjusting the temperature of the laser diode LD enables the wavelength of the light generated to be controlled. In the atmospheric optical telecommunication apparatus of the present embodiment, the wavelength of the light generated is changed in this manner by adjusting the temperature of the laser diode.

For controlling the wavelength of the light generated by the laser diode LD by adjusting the temperature of the laser diode, the laser package 52 of the laser diode LD of the atmospheric optical telecommunication apparatus of the present embodiment is provided with the Peltier device 51 shown in FIG. 13. The Peltier device electrothermally generates and absorbs heat, depending on the magnitude and direction of a current passed through the device. The laser package 52 is also fitted with the temperature sensor 49, which measures the temperature of the laser package. The wavelength control circuit 303 includes a circuit for controlling the heat emission and heat absorption by the Peltier element 51.

The temperature sensor 49 supplies a voltage corresponding to the detected temperature of the laser package 52 via the terminal 43 to the input of the comparator 48 in the wavelength control circuit 303. The CPU 302 feeds the reference voltage Vrt to the other input terminal of the comparator 48 via the terminal 50. The CPU generates the reference voltage Vrt in response to the information on the wavelength-dependent absorption by the trace components in the atmosphere maintained in its internal memory. The output of the comparator 48 is the control signal WCT, which drives the Peltier element 51 to control the generation and absorption of heat by the Peltier element. Thus, the wavelength control circuit 303, by controlling the value of the reference voltage Vrt, varies the generation and absorption of heat by the Peltier element 51. This, in turn, changes the temperature of the laser package 52 to modify the wavelength of the light generated by the laser diode LD.

Thus, in the atmospheric optical telecommunication apparatus of the present embodiment, the comparator 48 compares a voltage corresponding to the detected temperature of the laser package 52 generated by the temperature sensor 49 with the reference voltage Vrt generated in response to the information on the wavelength-dependent absorption by the trace components in the atmosphere maintained by the CPU 302 in the wavelength control circuit 303. The output of the comparator 48 controls the generation and absorption of heat by the Peltier element 51 to control the temperature of the laser diode, and, hence, the wavelength of the light generated by the laser diode in such a manner as to avoid the ill effects of wavelength-dependent absorption in the atmosphere.

It is seen from above that, with the atmospheric optical telecommunication apparatus according to the invention, the wavelength of the light generated by the laser diode may be changed significantly by changing the operating temperature of the laser diode, and the wavelength of the light may be finely adjusted by adjusting the value of the DC bias current generated by the transistor Tr.

Also, in a conventional atmospheric optical telecommunication apparatus, the temperature of the laser diode depends on the ambient temperature, which is subject to temporal changes. In the atmospheric optical telecommunication apparatus according to the invention, the temperature sensor 49 monitors in the temperature on and around the laser diode LD and the temperature control loop formed by the temperature sensor 49, the comparator 48 and the Peltier element 51 maintains the laser diode at the desired temperature, and, hence, the wavelength of the light at the desired value, despite changes in the ambient temperature.

In addition, the CPU 302, or another suitable circuit, can be used to monitor temporal changes in the ambient temperature of the laser diode LD. From the information on the temporal changes in the ambient temperature, it is determined whether the wavelength of the light generated by the laser is increasing or decreasing before the wavelength of the light generated is modified as described above. The CPU 302 determines from the information on the temporal changes in the ambient temperature of the laser diode detected by the temperature sensor 49 whether it is better to increase or to decrease the wavelength of the light generate to avoid the ill effects of the wavelength-dependent absorption in the atmosphere.

Figure 3:
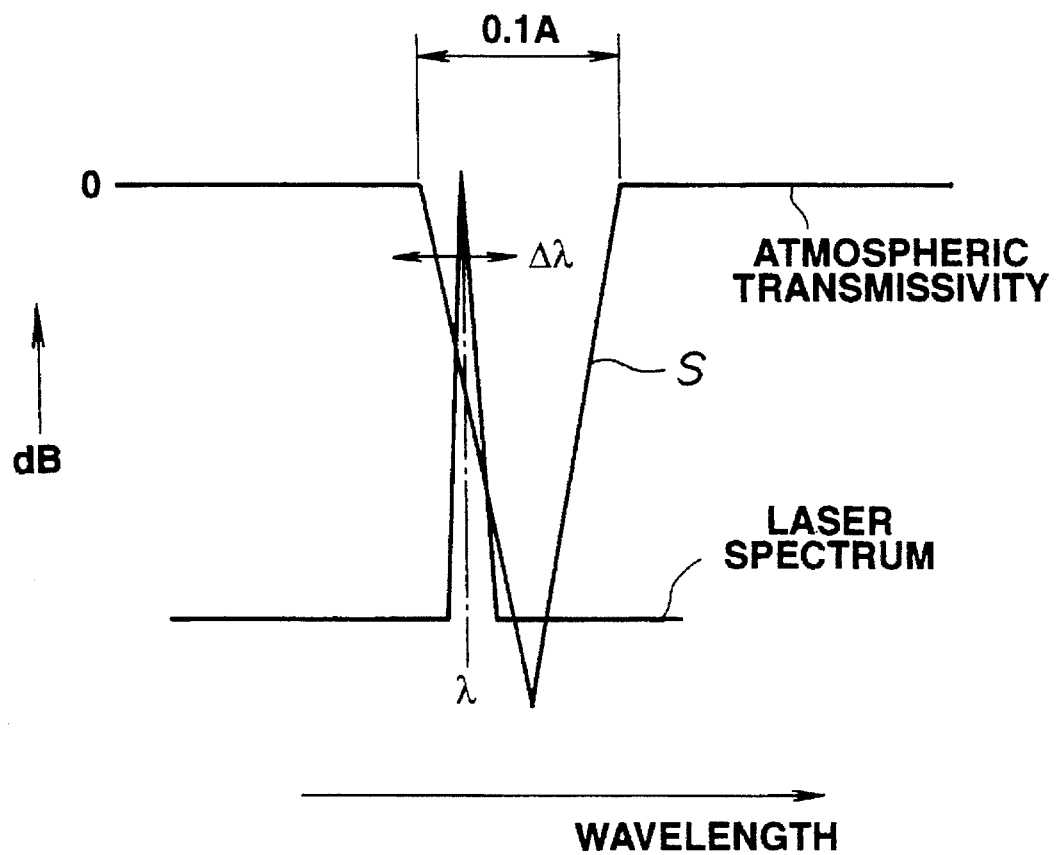
FIG. 3 illustrates the mechanism by which a narrow atmospheric absorption peak increases noise in an atmospheric optical telecommunication system.
Figure 4:
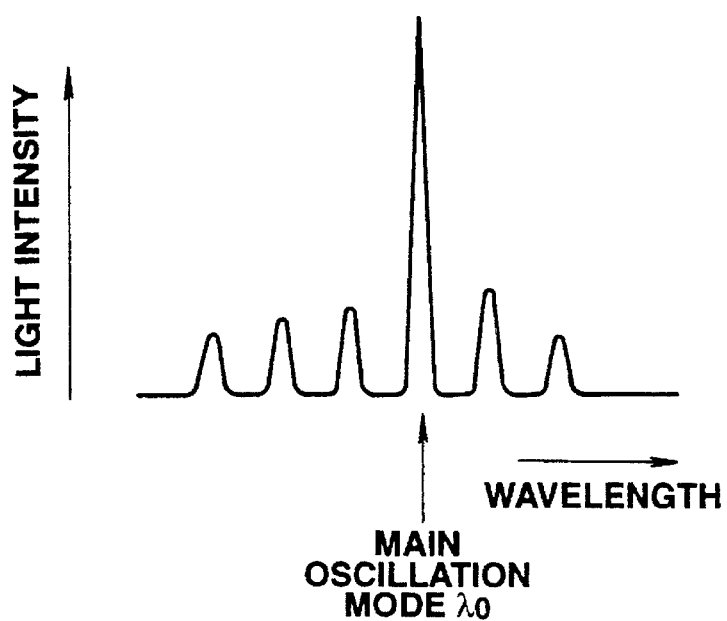
FIGS. 4A and 4B illustrate how mode distribution noise is generated by a semiconductor laser.
Figure 4:
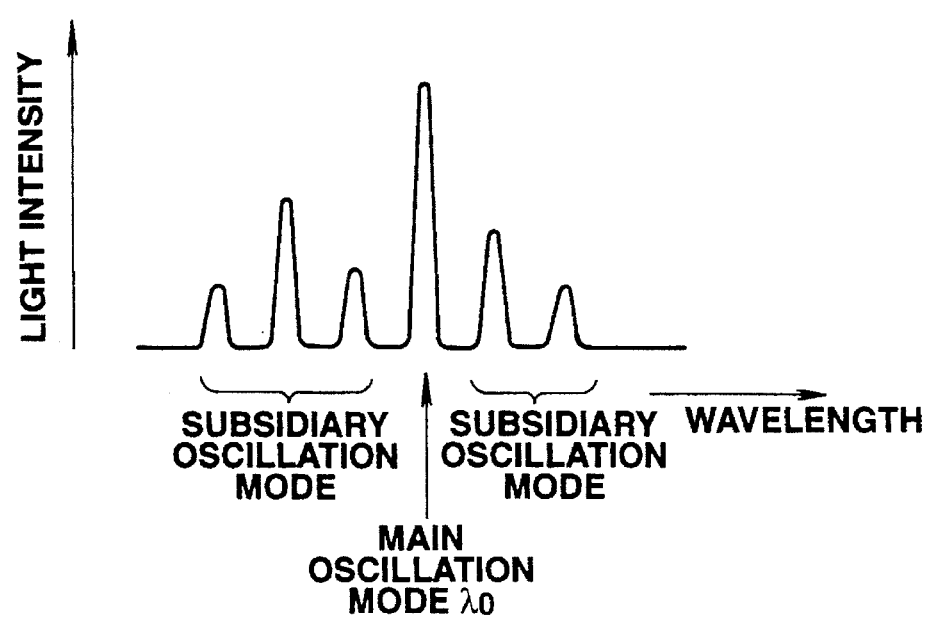
Figure 15:
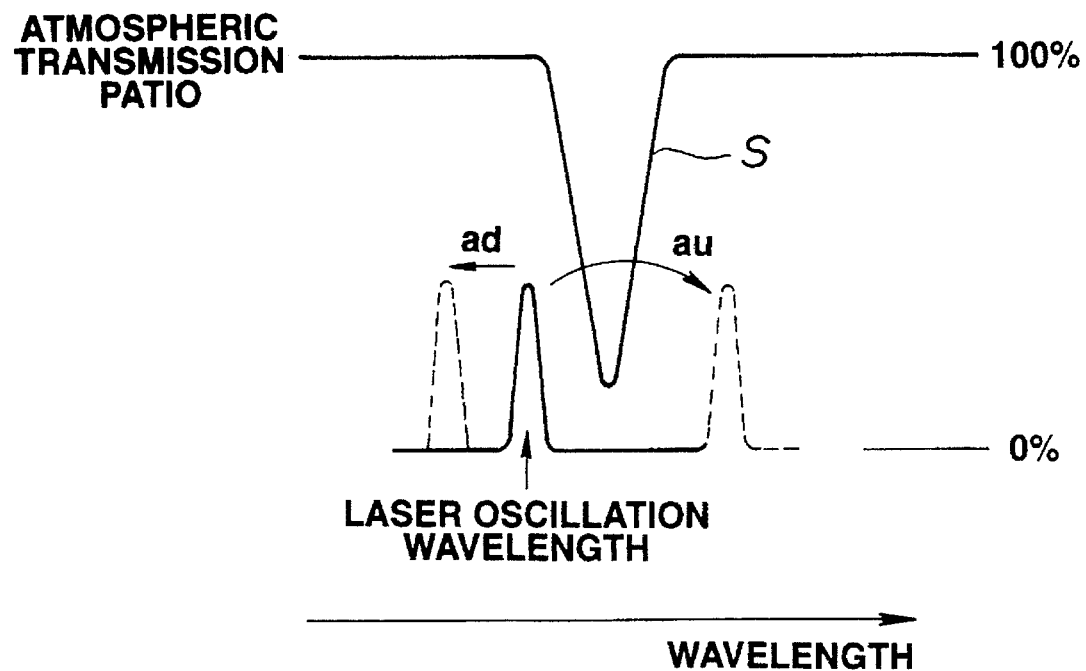
FIG. 15 illustrates a method by which the wavelength of the light generated by the laser is controlled to avoid absorption by an atmospheric absorption peak.

For, example, if the ambient temperature, and hence the wavelength of the light generated by the laser, are increasing, and, as shown in FIG. 15, which is similar to FIG. 3, the wavelength of the light is gradually approaching the wavelength range of the absorption peak S, where the transmission ratio of the atmosphere becomes strongly wavelength dependent, the CPU 302 will cause the Peltier element to reduce the temperature of the laser. This decreases the wavelength of the light generated by the laser in the direction shown by arrow ad in FIG. 15, and prevents the laser from emitting light at a wavelength in the wavelength range of the absorption peak S.

If the wavelength of the light generated by the laser diode LD is modified to prevent the laser diode from emitting light in the wavelength range of the absorption peak S, it may preferable to increase the wavelength of the light, or to skip the mode, to increase the wavelength beyond the wavelength range of the absorption peak S, as indicated by the arrow au in FIG. 15. Although FIG. 15 shows an example in which the wavelength of the light generated by the laser approaches the wavelength range of the absorption peak S, there may be instances in which the wavelength approaches the wavelength range of the absorption peak as a result of a fall in temperature. In this case, the wavelength of the light generated by the laser diode is increased to avoid the wavelength range of the absorption peaks. Alternatively, the wavelength may be lowered past the wavelength range of the absorption peak, or the mode may be lowered. Which of the above measures is used to control the wavelength of the light generated by the laser is selected depending on the ease with which mode skipping can be implemented in the laser in use or depending on the gradient of the temperature-dependent wavelength shifting.

Figure 16:
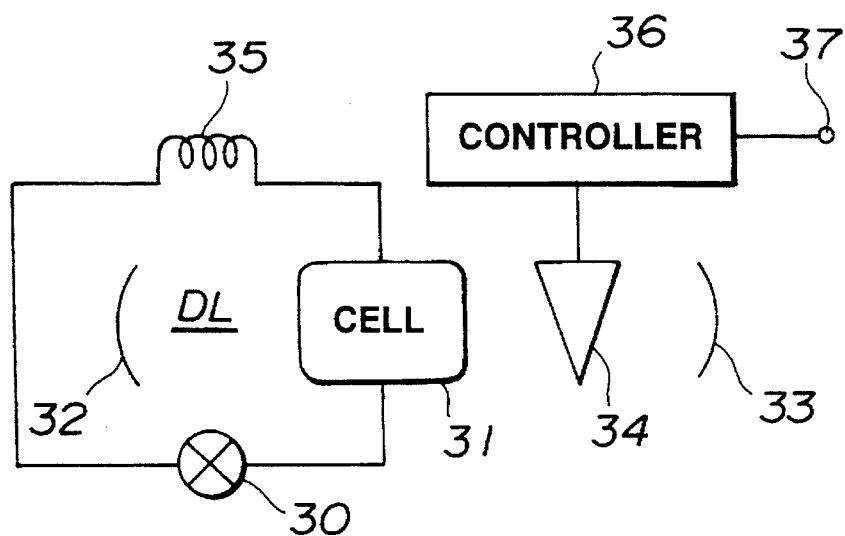
FIG. 16 shows the schematic construction of a dye laser as another practical example of a laser having adjustable frequency.

A dye laser may be used as the laser 113 in the atmospheric optical telecommunication apparatus according to the invention shown in FIG. 6B. A practical arrangement for implementing wavelength control of the light generated by a dye laser will now be described with reference to FIG. 16. In FIG. 16, the dye cell 31 in the dye laser DL is excited by the excitation power source 30 driving the coil 35. Light in a pre-set wavelength range is selected from the light emitted by the dye cell 31 by the optical resonator formed by the mirrors 32 and 33, and amplified by the optical resonator. The resulting laser light is fed out from the optical resonator via the mirror 33, which is partially transmissive.

In the atmospheric optical telecommunication apparatus according to the invention using a dye laser, the prism 34 is inserted into the optical resonator formed by the mirrors 32 and 33, and the angle, for example, of the prism 34 is adjusted to implement wavelength control of the light generated by the dye laser. The angle controller 36 adjusts the angle of the prism 34 in response to a wavelength control signal received from the wavelength control circuit 303 via the terminal 37. The wavelength control signal from the wavelength control circuit 303 is generated in response to the information on wavelength-dependent absorption by the trace components in the atmosphere maintained in the internal memory of the CPU 302 (FIG. 13).

With the arrangement shown, wavelength control by the wavelength control circuit 303 may be achieved even when the dye laser shown in FIG. 16 is used as the laser 113 in the atmospheric optical telecommunication apparatus according to the invention.

In the embodiments described above, each atmospheric optical telecommunication apparatus detects deterioration of the C/N ratio of the optical signals that it receives, and controls the wavelength of its own laser in response to the noise detection flag indicating such deterioration. However, an atmospheric optical telecommunication system may use a communication link to enable the optical receiver in each atmospheric optical telecommunication apparatus to transmit to the optical transmitter in the other atmospheric optical telecommunication apparatus a signal indicating the detection of a worsening of the C/N ratio of the optical signal received by the optical receiver. The wavelength of the laser in the optical transmitter in the other atmospheric optical telecommunication apparatus is then controlled in response to this signal received from the optical receiver. The signal indicating the detection of a worsening of the C/N ratio of the optical signal received by the optical receiver will be called a wavelength change request signal.

In the atmospheric optical telecommunication system according to the invention, in which two atmospheric optical telecommunication apparatus communicate optically with one another, each atmospheric optical telecommunication apparatus generates a wavelength change request signal in response to the noise detection flag detected by its own noise detection circuit 120 and transmits the wavelength change request signal to the other atmospheric optical telecommunication apparatus. Each atmospheric optical telecommunication apparatus receives the wavelength change request signal generated by and transmitted from the other atmospheric optical telecommunication apparatus, and changes the wavelength of its own laser light in response to the wavelength change request signal received from the other atmospheric optical telecommunication apparatus.

For transmission of the wavelength change request signal, each atmospheric optical telecommunication apparatus 181, 182 includes the wavelength change request generating circuit 304, which generates the wavelength change request signal, and feeds the wavelength change request signal to the driver 112. The driver 112 modulates the laser 113 in the atmospheric optical telecommunication apparatus with the wavelength change request signal to transmit the wavelength change request signal along with the transmission signal. Each atmospheric optical telecommunication apparatus 181, 182 also includes the wavelength change request detecting circuit 301 for extracting the wavelength change request signal from the signal received from the other atmospheric optical telecommunication apparatus 182, 181.

Figure 17:
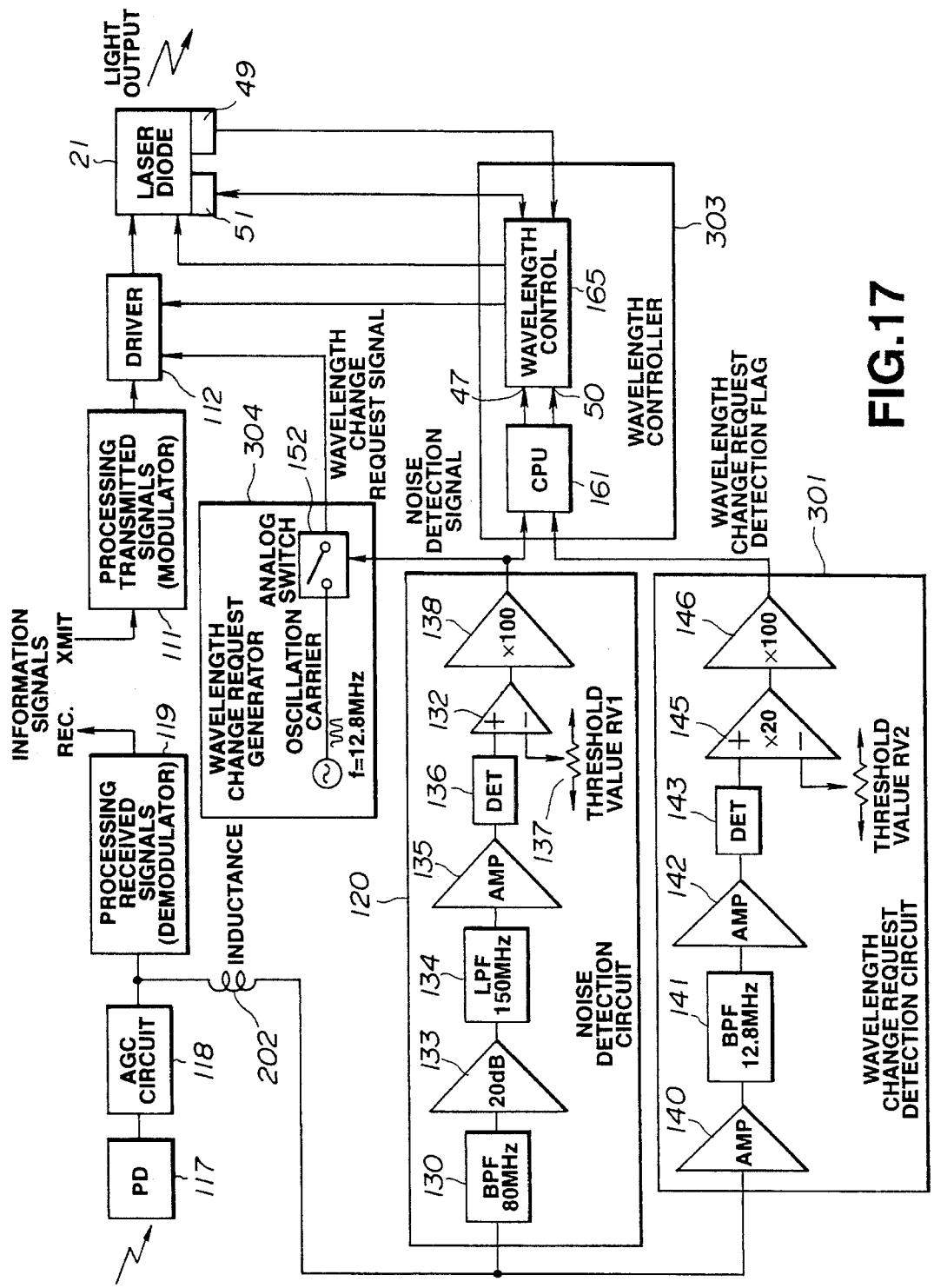
FIG. 17 is a block diagram showing the detailed construction of a second embodiment of an atmospheric optical telecommunication apparatus designed for transmission of a wavelength change request signal in which the laser is a laser diode.

A practical arrangement of the atmospheric optical telecommunication apparatus according to the invention capable of communicating the wavelength change request signal to another atmospheric optical telecommunication apparatus and capable of receiving the wavelength change request signal from another atmospheric optical telecommunication apparatus will now be described with reference to FIG. 17. In the example shown in FIG. 17, a laser diode is used as the laser 113. In FIG. 17, the components corresponding to those shown in FIG. 6B are denoted by the same reference numerals and the corresponding description of these components is partially omitted for simplicity. In the embodiment shown in FIG. 17, the carrier wave frequencies used for transmission and reception of the information signal are selected to be higher than 300 MHz. Alternatively, part of the frequency range below 400 MHz must be devoid of carrier waves to enable the required noise detection to be carried out.

The atmospheric optical telecommunication apparatus according to the invention may be configured to perform wavelength control in response to a noise detection flag detected by the apparatus itself in addition to performing wavelength control in response to a noise detection flag received from another atmospheric optical telecommunication apparatus. This enables the apparatus to be used in a atmospheric optical telecommunication system with another atmospheric optical telecommunication apparatus that lacks the ability to transmit the noise detection flag.

In FIG. 17, the photodetector 117, as the light receiving element described in FIG. 6B, receives the optical signal transmitted by the other atmospheric optical telecommunication apparatus and converts the optical signal into an electrical signal (O/E conversion), which it feeds to the AGC circuit 118. The AGC circuit 118 maintains the electrical signal at a constant level, and the output of the AGC circuit 118 is fed to the reception signal processing circuit 119 for demodulation, as described above with reference to FIG. 6B. Part of the electrical signal from the AGC circuit is also fed to the noise detection circuit 120 via the inductor 202 having a pre-set inductance. The inductor 202 acts as a low-pass filter, so that only the low-frequency range (0 to 200 MHz) of the output signal of the AGC circuit 118 is fed to the noise detection circuit 120. The inductor isolates the noise detection circuit front frequencies above this range, e.g., the signals in the transmission channels ch1 to ch4.

In the noise detection circuit 120, the low-frequency signal components from the AGC circuit 118 are passed through the band-pass filter 130, which passes the noise frequency components in a defined noise frequency range. The band-pass filter does not pass any wavelength change request signal present in the low-frequency signal components from the AGC circuit, nor does it pass any transmission channel signals. The noise detection circuit 120 has basically the same construction as that shown in FIG. 8. However, it may also be constructed as shown in FIG. 17.

In the circuit shown in FIG. 17, the noise frequency components extracted by the band-pass filter 130, are fed to the amplifier 133, which amplifies the noise frequency components by, for example, 20 dB, and feeds the amplified signal to the low-pass filter 134. The low-pass filter 134 has a cut-off frequency of 150 MHz, for example, and feeds the resulting low-pass filtered signal to the amplifier 135 for further amplification. The amplifiers 133 and 135 are used to provide stable diode detection by the diode D10 in the detector 136, and together give a total amplification of about 60 dB.

The amplified noise frequency components are rectified and detected by an AM rectifier-detector 136. The AM rectifier-detector 136 may be constructed as shown in FIG. 8 using the diode D10, the capacitor C10 and the resistor R10. The comparator 132 compares the level of the rectified and detected noise frequency components to that of a pre-set threshold value RV1 as set by a variable resistor 137. The output of the comparator changes state when the level of the detected noise frequency components increases above the threshold value set by the variable resistor 137. The output of the comparator changing state indicates that the noise has increased unusually, i.e., that the S/N ratio has deteriorated. The sensitivity with which a worsening of the C/N ratio is detected is set by changing the threshold value RV1 set by the variable resistor 137.

The output of the comparator 132 is a noise detection flag indicating whether or not an abnormally high noise level has been detected. The amplifier 138 amplifies the noise detection flag by a factor of 100 and acts as an output driver for the noise detection flag.

The output of the AGC circuit 118 is used in the noise detection circuit 120 as the source of the noise frequency components for noise detection because the AGC circuit maintains the signal level at its output constant. Hence, the noise level at the output of the AGC circuit 118 corresponds to the C/N ratio, degradation of which has the most significant effect on transmission quality, instead of corresponding to the absolute noise level.

If the noise detection flag at the output of the noise detection circuit 120 is set, it indicates that the noise frequency components have increased to an abnormally high level for some reason, and the C/N ratio has thereby been degraded. Thus, it is necessary to change the transmission operating conditions by changing the wavelength of the light generated by the laser diode of the other atmospheric optical telecommunication apparatus by transmitting a request to avoid the noisy transmission conditions. This may be implemented in various ways since it is sufficient to transmit to the other atmospheric optical telecommunication apparatus a simple request that the wavelength of the light generated by the laser diode therein be changed.

In the atmospheric optical telecommunication apparatus 181 according to the invention, the wavelength change request generating circuit 304 generates the information requesting the other atmospheric optical telecommunication apparatus 182 to change the wavelength of the light generated by the laser diode therein (corresponding to the laser diode 21). The wavelength change request generating circuit 304 is includes the oscillator 151 and the analog switch 152.

The oscillation frequency of the oscillator 151 is selected such that it does not affect the signal quality when superimposed on main signals, such as picture signals, and such that it is not detected by the noise detection circuit 120. In the preferred embodiment, a frequency of 12.8 MHz is used. In the atmospheric optical telecommunication apparatus according to the invention, a reference clock of 12.8 MHz which is used for operating the apparatus, is used as the oscillator 151.

The analog switch 152 operates in response to the noise detection flag from the noise detection circuit 120. When the noise detection flag is set, the analog switch connects the carrier from the oscillator 151 to the laser driver 112.

The carrier generated by the oscillator 151 in the wavelength change request generating circuit 304 is fed as the wavelength change request signal to the laser driver 112. The laser driver 112 superimposes the wavelength change request signal on the main signals from the transmission signal processing circuit 111. The output of the laser driver 112 is fed to the laser diode 21. In this way, information requesting that wavelength of the light generated by the laser diode in the other atmospheric optical telecommunication apparatus be changed (the wavelength change request signal) is transmitted to the other atmospheric optical telecommunication apparatus.

In the present embodiment, an arrangement is shown in which the wavelength change request signal is a carrier component added to the main signal, such as the picture signal, from the transmission signal processing circuit 111. However, it is however possible to add a carrier at a frequency in the order of 30 kHz, which is higher than the audible range, to audio signals or to communication network signal for internal communication (e.g., intercom signals) as the wavelength change request signal. A variety of such arrangements are possible.

When wavelength change request signals are transmitted between the apparatus constituting the atmospheric optical telecommunication system, a wavelength change request detecting circuit 301 for detecting the arrival of the wavelength change request signal must be provided in each atmospheric optical telecommunication apparatus. When the wavelength change request signal is transmitted, the wavelength control circuit 303 in each atmospheric optical telecommunication apparatus employs the wavelength change request signal received from the other atmospheric optical telecommunication apparatus and detected by the wavelength change request detecting circuit 301 to control the wavelength of the light generated by the laser instead of its own noise detection flag.

The construction of the wavelength change request detecting circuit 301 depends on the method by which the wavelength change request signal is transmitted. If the carrier generated by the oscillator 151 is superimposed on the main signal, as described above, the circuit is constructed as shown in FIG. 17. In FIG. 17, the wavelength change request detecting circuit 301 receives the low-frequency component (below 200 MHz) of the output of the AGC circuit 118 via the inductor 202. In the wavelength change request detecting circuit, the amplifier 140 amplifies the low-frequency component of the output of the AGC circuit 118, and the amplified signal is fed into the band-pass filter 141. The band-pass filter 141 has a high Q (narrow bandwidth) characteristic centered on the frequency of the oscillator 1.51 (12.8 MHz in the preferred embodiment).

The carrier frequency component extracted by the band-pass filter 141 is amplified by the amplifier 142, and is rectified and detected by the AM rectifier-detector 143. The AM rectifier-detector has a construction similar to the AM rectifier-detector shown in FIG. 8. The amplifiers 140 and 142 are used to provide stable diode detection by the diode D10 in the AM rectifier-detector 143 and together give a total amplification of about 60 dB.

The output of the AM rectifier-detector 143 is fed to one input of the comparator 145, which compares the level of the rectified and detected carrier frequency component to a pre-set threshold value RV2 set by the variable resistor 147. The state of the output of the comparator 145 indicates whether the wavelength change request signal has been received. Since the output of the comparator 145 is employed as a flag indicating whether or not the wavelength of the light generated by the laser is to be changed, it is termed as the wavelength change request detection flag. In the wavelength change request detecting circuit 301, the detection sensitivity may be modified by changing the value RV2 of the variable resistor 147.

Although the wavelength change request signal is detected in the present embodiment by the diode detecting circuit in the wavelength change request detecting circuit 301, such detection of the wavelength change request signal may be readily achieved by a synchronous detection circuit or by other types of detection circuit.

The output of the wavelength change request detecting circuit 301 is led to the wavelength control circuit 303. The wavelength control circuit 303 is the same as the circuit described above with reference to FIG. 8 for controlling the wavelength of the light generated by the laser in response to its own noise detection flag. When the wavelength change request signal is received from the other atmospheric optical telecommunication apparatus, the wavelength of the light generated by the laser diode is controlled in response to the wavelength change request detection flag supplied from the wavelength change request detecting circuit 301.

The wavelength control circuit 303 may include the wavelength control circuit 165, having the same construction as the main component of the wavelength control circuit 303 described above with reference to FIG. 8, and the CPU 161 for generating the reference voltages Vrp and Vrt in response to information on the wavelength-dependent absorption by the trace components in the atmosphere maintained in an internal memory (not shown). The CPU 161 generates new reference voltages Vrp and Vrt when it receives the wavelength change request detection flag from the wavelength change request detection circuit 301, and feeds them to the wavelength control circuit 165.

When the CPU 161 receives the wavelength change request detection flag, it generates, in response to information concerning the current wavelength of the light generated by the laser diode 121 and the information on the wavelength-dependent absorption by trace components in the atmosphere maintained in its internal memory, new reference voltages Vrp and Vrt, and feeds them to the terminals 47 and 50 of the wavelength control circuit 165. The new reference voltages respectively adjust the control signal WCI, i.e., the DC bias current for the transistor Tr of the driver 112, and/or the control signal WCT for controlling the generation or absorption of heat by the Peltier element 51.

When the laser is a semiconductor laser diode, the wavelength of the light generated by the laser in each atmospheric optical telecommunication apparatus is controlled in the manner just described in response to the wavelength change request signal transmitted by the other atmospheric optical telecommunication apparatus.

Figure 18:
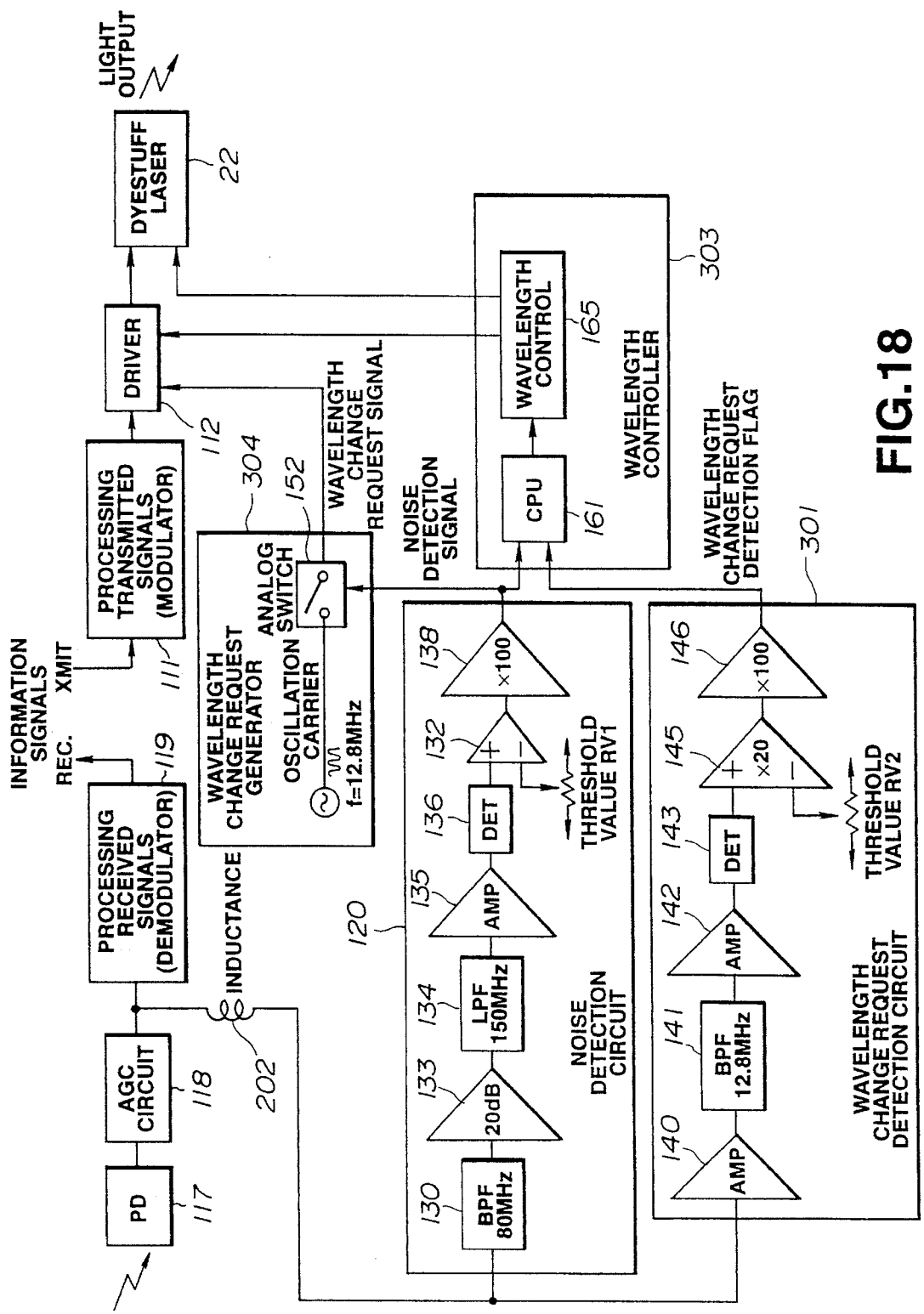
FIG. 18 is a block diagram showing the detailed construction of a third embodiment of an atmospheric optical telecommunication apparatus designed for transmission of a wavelength change request signal in which the laser is a dye laser.

FIG. 18 shows an arrangement in which a dye laser, similar to one shown in FIG. 16, is used as the laser. In FIG. 18, parts or components similar to those shown in FIG. 17 are indicated by the same reference numerals.

The arrangement of FIG. 18 differs from that shown in FIG. 17 only in that the wavelength control circuit 303 controls the wavelength of the light generated by the dye laser 22 in the manner described above with reference to FIG. 16.

The processing for bidirectional communication of the wavelength change request signal between the two atmospheric optical telecommunication apparatus constituting an atmospheric optical telecommunication system, and for changing the wavelength of the light generated by the respective lasers in response to the transmitted wavelength change request signal will be described with reference to the flowchart shown in FIG. 19 and with reference to FIGS. 6A, 17, and 18. In the processing illustrated in the flowchart, detection of the worsening of the C/N ratio is made by the atmospheric optical telecommunication apparatus 181 shown in FIG. 6A and wavelength of the light generated by the laser is changed by the atmospheric optical telecommunication apparatus 182 which has received the wavelength change request signal from the atmospheric optical telecommunication apparatus 181.

Figure 19:
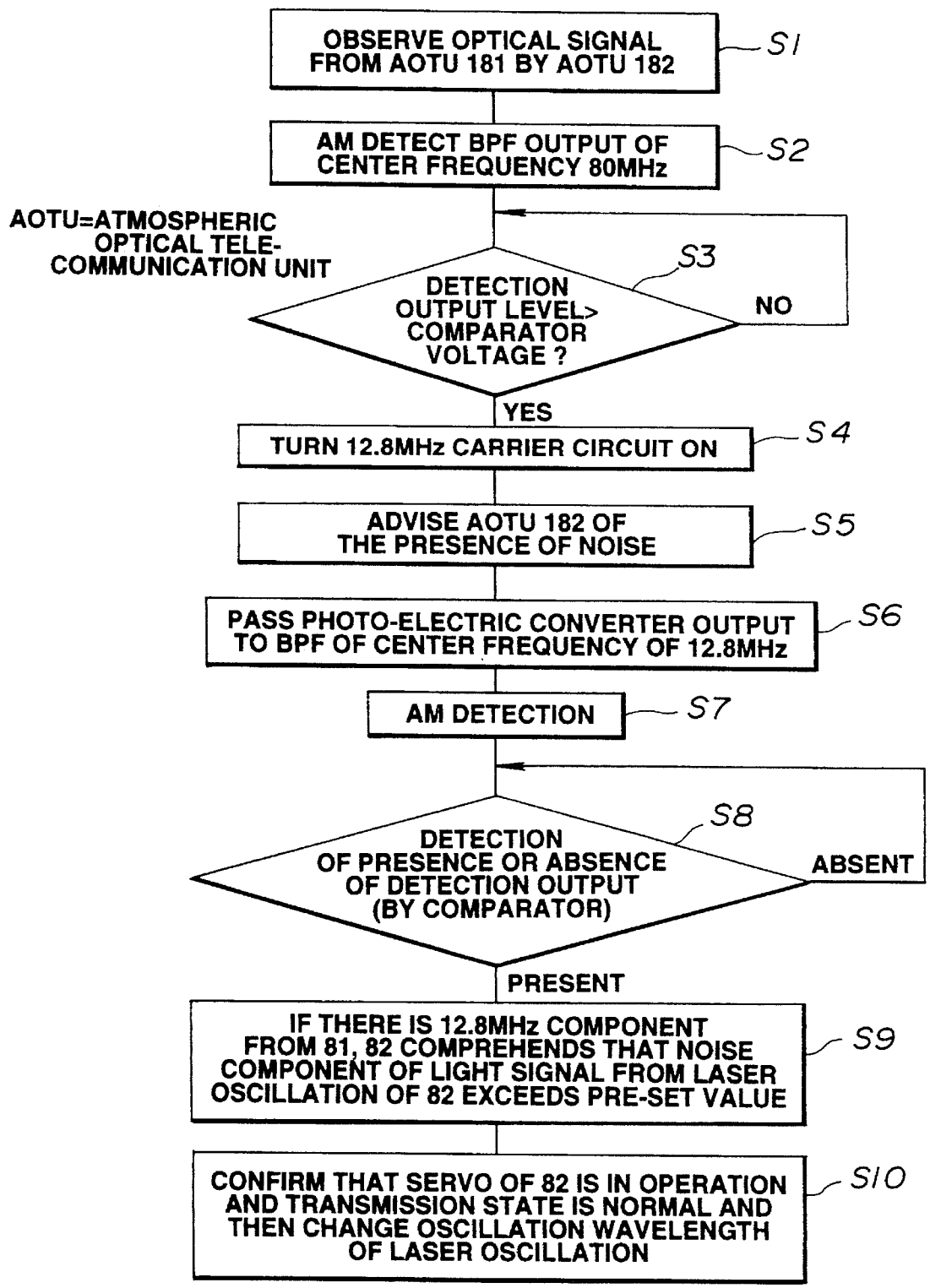
FIG. 19 is a flow chart tier illustrating the manner of communication of the wavelength change request signal in a atmospheric optical telecommunication system using two atmospheric optical telecommunication units according to the invention. In this, the wavelength of the light generated by the laser in one of the units is controlled in response to a wavelength change request signal transmitted by the other of the units.

In FIG. 19, at step S1, the optical signal transmitted by the atmospheric optical telecommunication apparatus 182 is received by the atmospheric optical telecommunication apparatus 181.

At step S2, the output of the band-pass filter 130 having a center frequency of 80 MHz is AM detected by the AM rectifier-detector 136.

At step S3, it is determined whether the output level of the AM rectifier-detector 136 is greater than the reference voltage set by the variable resistor RV1. If the output level of the AM rectifier-detector is greater than the reference voltage, execution proceeds to step S4. If the output level of the AM rectifier-detector is not greater than the reference voltage, execution returns to step S3, or may return to step S1.

At step S4, the analog switch 152 of the wavelength change request generating circuit 304 is turned on to feed the output of the oscillator 151 to the driver 121 to cause the laser to transmit the wavelength change request signal.

At step S5, the laser diode 21 transmits the wavelength change request signal to request the other atmospheric optical telecommunication apparatus 182 to change the wavelength of the light generated by its laser because the C/N ratio of the optical signal received by the atmospheric optical telecommunication apparatus 181 has worsened.

At step S6, the atmospheric optical telecommunication apparatus 182 receives the light beam transmitted by the atmospheric optical telecommunication apparatus 181 and the light-electrical converter therein (i.e., the photodiode 117) converts the received optical signal into an electrical signal, the lower-frequency components of which are passed to the wavelength change request detecting circuit 301 via the AGC circuit 118 and the inductor 202. In the wavelength change request detecting circuit 301, the wavelength change request signal is extracted from the lower-frequency components of the electrical signal by the band-pass filter 140 having a center frequency of 12.8 MHz.

At step S7, AM detection of the wavelength change request signal is carried out by the AM rectifier-detector 145.

At step S8, it is determined whether the output level of the AM rectifier-detector 145 is greater than the reference voltage set by the variable resistor RV2. If the output level of the AM rectifier-detector 145 is less than the reference voltage, indicating that the wavelength change request signal has not been received, processing returns to step S8 (or may return to step S6). If the output level of the AM rectifier-detector 145 is greater than the reference voltage, indicating that the wavelength change request signal has been received from the atmospheric optical telecommunication apparatus 181, the wavelength change request flag is set, and processing advances to step S9.

At step S9, the setting of the wavelength change request flag in the atmospheric optical telecommunication apparatus 182 indicates that the noise component of optical signal received by the atmospheric optical telecommunication apparatus 181 has become larger than a pre-set level.

Finally, at step S10, the atmospheric optical telecommunication apparatus 182 recognizes that the atmospheric optical communication with the atmospheric optical telecommunication apparatus 181 is under servo control and is in a normal state of transmission. In response to the wavelength change request flag, the wavelength control circuit 303 of the atmospheric optical telecommunication apparatus 181 changes the wavelength of the light generated by the laser. If the laser is a laser diode, the wavelength of the light generated by the laser diode is controlled at step S10 by changing the bias current of the transistor Tr and/or by adjusting the temperature of the laser diode. If the laser is a dye laser, the wavelength of the light generated by the laser is controlled by adjusting the angle of the prism 34.

In the atmospheric optical telecommunication apparatus according to the invention, degradation of the C/N ratio due to wavelength-dependent absorption by trace components, such as carbon dioxide or water vapor, in the atmosphere of the light beam is detected, and the wavelength of the light generated by the laser is changed to avoid the frequency range of the atmospheric absorption peaks, where atmospheric absorption is highly wavelength-dependent. This mitigates the ill effects caused by wavelength-dependent absorption.

Also, in the present embodiment, the deterioration in the C/N ratio caused by wavelength-dependent absorption by the trace components in the atmosphere is detected by the optical receiver in each of the atmospheric optical telecommunication apparatus constituting an atmospheric optical telecommunication system and a wavelength change request signal is transmitted to the other atmospheric optical telecommunication apparatus. The wavelength of the light generated by the laser in the other atmospheric optical telecommunication apparatus is controlled in response to the received wavelength change request signal. This provides control of wavelength of the laser beam that is actually subject to the C/N ratio deterioration during the transmission.

In the present embodiment, the frequency range for detecting the deterioration in the C/N ratio is set to 80 MHz to exclude the carrier frequencies of the information signals being transmitted and received, and to allow the effects of the information signals and other signals, such as television signals, to be avoided.

If the laser is a laser diode, in the present embodiment, the wavelength of the light generated by the laser is changed by controlling the temperature of the laser diode in response to the noise detection flag or to the wavelength change request detection flag, and/or by controlling the DC bias current through the laser diode driven by the transistor Tr of the driver 112. Changing the laser diode temperature enables large changes to be made in the wavelength of the light generated; changing the bias current provides a fine control of the wavelength.

If the laser is a dye laser, its wavelength is changed by adjusting the angle of the prism 34 when a reduced C/N value is detected.

In the atmospheric optical telecommunication apparatus according to the invention, temporal changes in the temperature around the laser diode detected by the temperature sensor 49 are monitored by the CPU. This enables the wavelength of the light generated by the laser to be set more efficiently to one at which wavelength-dependent atmospheric absorption is avoided.

Thus, in the atmospheric optical telecommunication apparatus according to the invention, noise that depends on the wavelength of the light generated by the laser may in principle be avoided to enable stable and high quality atmospheric optical communication to be performed.

Although illustrative embodiments of the invention are described in detail, it is to be understood that the invention is not limited to the precise embodiments described, and that various modifications may be practiced within the scope of the invention defined by the appended claims.

We claim:

1. A method of mitigating effects of wavelength-dependent atmospheric transmission characteristics on an atmospheric optical telecommunication system comprising two atmospheric optical telecommunication units communicating with one another using light propagated through the atmosphere, each of the atmospheric telecommunication units including an optical transmitter having a laser generating a transmitted light beam for reception by the other of the atmospheric optical telecommunications units, the transmitted light beam having a wavelength, the transmitted light beam modulated in accordance with an information signal, and an optical receiver, the optical receiver generating an electrical signal in response to a received light beam received from the other of the atmospheric optical telecommunication units, the method comprising the steps of:

detecting, in the electrical signal, an increase in noise above a normal noise level and generating a flag signal in response thereto, the increase in noise being due to the received light beam having a wavelength at which the atmosphere has a wavelength-dependent transmission characteristic; and in response to the flag signal, changing the wavelength of the modulated transmitted light beam to a wavelength at which the transmission characteristic of the atmosphere is less wavelength-dependent.

2. The method of claim 1, wherein the steps of detecting an increase in noise and changing the wavelength of the transmitted light beam are both performed in the same one of the atmospheric optical telecommunication units.

3. The method of claim 1, wherein: the step of detecting an increase in noise is performed in one of the atmospheric optical telecommunication units;

the method additionally comprises steps of:

transmitting the flag signal from the one of the atmospheric optical telecommunication units, and receiving the flag signal at the other of the atmospheric optical telecommunication units; and the step of changing the wavelength of the transmitted light beam is performed in the other of the atmospheric optical telecommunication units in response to the flag signal received thereby.

4. A method of mitigating effects of wavelength-dependent atmospheric transmission characteristics on an atmospheric optical telecommunication system comprising two atmospheric optical telecommunication units communicating with one another using light propagated through the atmosphere, each of the atmospheric telecommunication units including an optical transmitter having a laser generating a transmitted light beam for reception by the other of the atmospheric optical telecommunications units, the transmitted light beam having a wavelength, and an optical receiver, the optical receiver generating an electrical signal in response to a received light beam received from the other of the atmospheric optical telecommunication units, the method comprising the steps of:

detecting, in the electrical signal, an increase in noise above a normal noise level and generating a flag signal in response thereto, the increase in noise being due to the received light beam having a wavelength at which the atmosphere has a wavelength-dependent transmission characteristic; and in response to the flag signal, changing the wavelength of the transmitted light beam to a wavelength at which the transmission characteristic of the atmosphere is less wavelength-dependent, wherein:

the laser is a laser diode having an operating temperature; and the step of changing the wavelength of the transmitted light beam includes a step of changing the operating temperature of the laser diode in response to the flag signal.

5. The method of claim 4, wherein:

the method additionally includes a step of monitoring temporal changes in the operating temperature of the laser diode to generate temporal temperature change information; and the step of changing the operating temperature of the laser diode includes a step of determining a direction of change of the operating temperature of the laser diode using the temporal temperature change information generated in the monitoring step.

6. The method of claim 4, wherein the steps of detecting an increase in noise and changing the wavelength of the transmitted light beam are both performed in the same one of the atmospheric optical telecommunication units.

7. The method of claim 4, wherein:
the step of detecting an increase in noise is performed in one of the atmospheric optical telecommunication units;
the method additionally comprises steps of:
transmitting the flag signal from the one of the atmospheric optical telecommunication units, and
receiving the flag signal at the other of the atmospheric optical telecommunication units; and
the step of changing the wavelength of the transmitted light beam is performed in the other of the atmospheric optical telecommunication units in response to the flag signal received thereby.

8. A method of mitigating effects of wavelength-dependent atmospheric transmission characteristics on an atmospheric optical telecommunication system comprising two atmospheric optical telecommunication units communicating with one another using light propagated through the atmosphere, each of the atmospheric telecommunication units including an optical transmitter having a laser generating a transmitted light beam for reception by the other of the atmospheric optical telecommunications units, the transmitted light beam having a wavelength, and an optical receiver, the optical receiver generating an electrical signal in response to a received light beam received from the other of the atmospheric optical telecommunication units, the method comprising the steps of:
detecting, in the electrical signal, an increase in noise above a normal noise level and generating a flag signal in response thereto, the, increase in noise being due to the received light beam having a wavelength at which the atmosphere has a wavelength-dependent transmission characteristic; and
in response to the flag signal, changing the wavelength of the transmitted light beam to a wavelength at which the transmission characteristic of the atmosphere is less wavelength-dependent, wherein:
the laser is a laser diode operating at a DC bias current; and
the step of changing the wavelength of the transmitted light beam includes a step of changing the DC bias current of the laser diode in response to the flag signal.

9. The method of claim 8, wherein the steps of detecting an increase in noise and changing the wavelength of the transmitted light beam are both performed in the same one of the atmospheric optical telecommunication units.

10. The method of claim 8, wherein:
the step of detecting an increase in noise is performed in one of the atmospheric optical telecommunication units;
the method additionally comprises steps of:
transmitting the flag signal from the one of the atmospheric optical telecommunication units, and
receiving the flag signal at the other of the atmospheric optical telecommunication units; and
the step of changing the wavelength of the transmitted light beam is performed in the other of the atmospheric optical telecommunication units in response to the flag signal received thereby.

11. A method of mitigating effects of wavelength-dependent atmospheric transmission characteristics on an atmospheric optical telecommunication system comprising two atmospheric optical telecommunication units communicating with one another using light propagated through the atmosphere, each of the atmospheric telecommunication units including an optical transmitter having a laser generating a transmitted light beam for reception by the other of the atmospheric optical telecommunications units, the transmitted light beam having a wavelength, and an optical receiver, the optical receiver generating an electrical signal in response to a received light beam received from the other of the atmospheric optical telecommunication units, the method comprising the steps of:
detecting, in the electrical signal, an increase in noise above a normal noise level and generating a flag signal in response thereto, the increase in noise being due to the received light beam having a wavelength at which the atmosphere has a wavelength-dependent transmission characteristic; and
in response to the flag signal, changing the wavelength of the transmitted light beam to a wavelength at which the transmission characteristic of the atmosphere is less wavelength-dependent, wherein:
the laser is a dye laser including an optical resonator; and
the step of changing the wavelength of the transmitted light beam includes a step of re-tuning the optical resonator in response to the flag signal.

12. The method of claim 11, wherein the steps of detecting an increase in noise and changing the wavelength of the transmitted light beam are both performed in the same one of the atmospheric optical telecommunication units.

13. The method of claim 11, wherein:
the step of detecting an increase in noise is performed in one of the atmospheric optical telecommunication units;
the method additionally comprises steps of:
transmitting the flag signal from the one of the atmospheric optical telecommunication units, and
receiving the flag signal at the other of the atmospheric optical telecommunication units; and
the step of changing the wavelength of the transmitted light beam is performed in the other of the atmospheric optical telecommunication units in response to the flag signal received thereby.

14. A method of mitigating effects of wavelength-dependent atmospheric transmission characteristics on an atmospheric optical telecommunication system comprising two atmospheric optical telecommunication units communicating with one another using light propagated through the atmosphere, each of the atmospheric telecommunication units including an optical transmitter having a laser generating a transmitted light beam reception by the other of the atmospheric optical telecommunications units, the transmitted light beam having a wavelength, and an optical receiver, the optical receiver generating an electrical signal in response to a received light beam received from the other of the atmospheric optical telecommunication units, the method comprising the steps of:
detecting, in the electrical signal, an increase in noise above a normal noise level and generating a flag signal in response thereto, the, increase in noise being due to the received light beam having a wavelength at which the atmosphere has a wavelength-dependent transmission characteristic; and
in response to the flag signal, changing the wavelength of the transmitted light beam to a wavelength at which the transmission characteristic of the atmosphere is less wavelength-dependent, wherein:

each of the atmospheric optical telecommunication units stores data representing wavelength-dependent atmospheric transmission characteristics; and the step of changing the wavelength of the transmitted light beam includes steps of:

reading the data representing wavelength-dependent atmospheric transmission characteristics in response to the flag signal, and changing the wavelength of the transmitted light beam by an amount determined by the data representing wavelength-dependent atmospheric transmission characteristics read in the reading step.

15. A method of mitigating effects of wavelength-dependent atmospheric transmission characteristics on an atmospheric optical telecommunication system comprising two atmospheric optical telecommunication units communicating with one another using light propagated through the atmosphere, each of the atmospheric telecommunication units including an optical transmitter having a laser generating a transmitted light beam for reception by the other of the atmospheric optical telecommunications units, the transmitted light beam having a wavelength, and an optical receiver, the optical receiver generating an electrical signal in response to a received light beam received from the other of the atmospheric optical telecommunication units, the method comprising the steps of:

detecting, in the electrical signal, an increase in noise above a normal noise level and generating a flag signal in response thereto, the increase in noise being due to the received light beam having a wavelength at which the atmosphere has a wavelength-dependent transmission characteristic; and in response to the flag signal, changing the wavelength of the transmitted light beam to a wavelength at which the transmission characteristic of the atmosphere is less wavelength-dependent, wherein:

the received light beam is modulated with an information signal having a carrier frequency; and the step of detecting an increase in noise includes a step of measuring a level in the electrical signal at a frequency below the carrier frequency.

16. A circuit for use in an atmospheric optical telecommunication unit for mitigating effects of wavelength-dependent atmospheric transmission characteristics when the atmospheric optical telecommunication is used together with another atmospheric optical telecommunication unit to form an atmospheric optical telecommunication system in which the atmospheric optical telecommunication units communicate with one another using light propagated through the atmosphere, the atmospheric telecommunication unit including an optical transmitter having a laser generating a transmitted light beam for reception by the other atmospheric optical telecommunications unit, the transmitted light beam having a wavelength, the transmitted light beam being modulated in accordance with an information signal, and an optical receiver, the optical receiver generating an electrical signal in response to a received light beam received from the other atmospheric optical telecommunication unit, the circuit comprising:

detecting means for detecting, in the electrical signal, an increase in noise above a normal noise level and for generating a flag signal in response thereto, the increase in noise being due to the received light beam having a wavelength at which the atmosphere has a wavelength-dependent transmission characteristic; and wavelength changing means, operating in response to the flag signal, for changing the wavelength of the modulated transmitted light beam to a wavelength at which the transmission characteristic of the atmosphere is less wavelength-dependent.

17. A circuit for use in on atmospheric optical telecommunication unit for mitigating effects of wavelength-dependent atmospheric transmission characteristics when the atmospheric optical telecommunication is used together with another atmospheric optical telecommunication unit to form an atmospheric, optical telecommunication system in which the atmospheric optical telecommunication units communicate with one another using light propagated through the atmosphere, the atmospheric telecommunication unit including an optical transmitter having a laser generating a transmitted light beam for reception by the other atmospheric, optical telecommunications unit, the transmitted light beam having a, wavelength, and an optical receiver, the optical receiver generating an electrical signal in response to a received light beam received from the other atmospheric optical telecommunication unit, the circuit comprising:

detecting means for detecting, in the electrical signal, an increase in noise above a normal noise level and for generating a flag signal in response thereto, the increase in noise being due to the received light beam having a wavelength at which the atmosphere has a wavelength-dependent transmission characteristic; and wavelength changing means, operating in response to the flag signal, for changing the wavelength of the transmitted light beam to a wavelength at which the transmission characteristic of the atmosphere is less wavelength-dependent, wherein:

the circuit additionally comprises:

modulating means, operating in response to the flag signal, for modulating the laser with a first signal component to transmit the flag signal, and demodulating means for extracting a second signal component from the electrical signal; and the wavelength changing means operates in response to the second signal component from the demodulating means in lieu of the flag signal.

18. A circuit for use in an atmospheric optical telecommunication unit for mitigating effects of wavelength-dependent atmospheric transmission characteristics when the atmospheric optical telecommunication is used together with another atmospheric optical telecommunication unit to form an atmospheric optical telecommunication system in which the atmospheric optical telecommunication units communicate with one another using light propagated through the atmosphere, the atmospheric telecommunication unit including an optical transmitter having a laser generating a transmitted light beam for reception by the other atmospheric optical telecommunications unit, the transmitted light beam having a wavelength, and .an optical receiver, the optical receiver generating an electrical signal in response to a received light beam received from the other atmospheric optical telecommunication unit, the circuit comprising:

detecting means for detecting, in the electrical signal, an increase in noise above a normal noise level and for generating a flag signal in response thereto, the increase in noise being due to the received light beam having a wavelength at which the atmosphere has a wavelength-dependent transmission characteristic; and wavelength changing means, operating in response to the flag signal, for changing the wavelength of the transmitted light beam to a wavelength at which the transmission characteristic of the atmosphere is less wavelength-dependent, wherein:

the laser is a laser diode having an operating temperature; and the wavelength changing means includes temperature changing means for changing the operating temperature of the laser diode in response to the flag signal.

19. The circuit of claim 18, wherein:

the circuit additionally includes means for monitoring temporal changes in the operating temperature of the laser diode to generate temporal temperature change information; and the temperature changing means includes means for determining a direction of change of the operating temperature of the laser diode using the temporal temperature change information.

20. The circuit of claim 18, wherein:

the circuit additionally comprises:
  modulating means, operating in response to the flag signal, for modulating the laser diode with a first signal component to transmit the flag signal, and
  demodulating means for extracting a second signal component from the electrical signal; and the temperature changing means operates in response to the second signal component from the demodulating means in lieu of the flag signal.

21. A circuit for use in an atmospheric optical telecommunication unit for mitigating effects of wavelength-dependent atmospheric transmission characteristics when the atmospheric optical telecommunication is used together with another atmospheric optical telecommunication unit to form an atmospheric optical telecommunication system in which the atmospheric optical telecommunication units communicate with one another using light propagated through the atmosphere, the atmospheric telecommunication unit including an optical transmitter having a laser generating a transmitted light beam for reception by the other atmospheric optical telecommunications unit, the transmitted light beam having a wavelength, and an optical receiver, the optical receiver generating an electrical signal in response to a received light beam received from the other atmospheric optical telecommunication unit, the circuit comprising:

detecting means for detecting, in the electrical signal, an increase in noise above a normal noise level and for generating a flag signal in response thereto, the increase in noise being due to the received light beam having a wavelength at which the atmosphere has a wavelength-dependent transmission characteristic; and wavelength changing means, operating in response to the flag signal, for changing the wavelength of the transmitted light beam to a wavelength at which the transmission characteristic of the atmosphere is less wavelength-dependent, wherein:

the laser is a laser diode operating at a DC bias current; and the wavelength changing means includes current changing means for changing the DC bias current of the laser diode in response to the flag signal.

22. The circuit of claim 21, wherein:

the circuit additionally comprises:
  modulating means, operating in response to the flag signal, for modulating the laser diode with a first signal component to transmit the flag signal, and
  demodulating means for extracting a second signal component from the electrical signal; and the current changing means operates in response to the second signal component from the demodulating means in lieu of the flag signal.

23. A circuit for use in an atmospheric optical telecommunication unit for mitigating effects of wavelength-dependent atmospheric transmission characteristics when the atmospheric optical telecommunication is used together with another atmospheric optical telecommunication unit to form an atmospheric optical telecommunication system in which the atmospheric optical telecommunication units communicate with one another using light propagated through the atmosphere, the atmospheric telecommunication unit including an optical transmitter having a laser generating a transmitted light beam for reception by the other atmospheric optical telecommunications unit, the transmitted light beam having a wavelength, and an optical receiver, the optical receiver generating an electrical signal in response to a received light beam received from the other atmospheric optical telecommunication unit, the circuit comprising:

detecting means for detecting, in the electrical signal, an increase in noise above a normal noise level and for generating a flag signal in response thereto, the increase in noise being due to the received light beam having a wavelength at which the atmosphere has a wavelength-dependent transmission characteristic; and wavelength changing means, operating in response to the flag signal, for changing the wavelength of the transmitted light beam to a wavelength at which the transmission characteristic of the atmosphere is less wavelength-dependent, wherein:

the laser is a dye laser including an optical resonator; and the wavelength changing means includes re-tuning means for re-tuning the optical resonator in response to the flag signal.

24. The circuit of claim 23, wherein:

the circuit additionally comprises:
  modulating means, operating in response to the flag signal, for modulating the laser with a first signal component to transmit the flag signal, and
  demodulating means for extracting a second signal component from the electrical signal; and the re-tuning means operates in response to the second signal component from the demodulating means in lieu of the flag signal.

25. A circuit for use in an atmospheric optical telecommunication unit for mitigating effects of wavelength-dependent atmospheric transmission characteristics when the atmospheric optical telecommunication is used together with another atmospheric optical telecommunication unit to form an atmospheric optical telecommunication system in which the atmospheric optical telecommunication units communicate with one another using light propagated through the atmosphere, the atmospheric telecommunication unit including an optical transmitter having a laser generating a transmitted light beam for reception by the other atmospheric optical telecommunications unit, the transmitted light beam having a wavelength, and an optical receiver, the optical receiver generating an electrical signal in response to a received light beam received from the other atmospheric optical telecommunication unit, the circuit comprising:

detecting means for detecting, in the electrical signal, an increase in noise above a normal noise level and for generating a flag signal in response thereto, the increase in noise being due to the received light beam having a wavelength at which the atmosphere has a wavelength-dependent transmission characteristic; and wavelength changing means, operating in response to the flag signal, for changing the wavelength of the transmitted light beam to a wavelength at which the transmission characteristic of the atmosphere is less wavelength-dependent, wherein:

the circuit includes memory means for storing data representing wavelength-dependent atmospheric transmission characteristics; and the wavelength changing means includes:
   means for reading the data representing wavelength-dependent atmospheric transmission characteristics from the memory means in response to the flag signal, and
   change determining means for determining an amount of change in the wavelength of the transmitted light beam from the data representing wavelength-dependent atmospheric transmission characteristics read from the memory means; and
the wavelength changing means changes the wavelength of the transmitted light beam by the amount of change determined by the change determining means.

26. A circuit for use in an atmospheric optical telecommunication unit for mitigating effects of wavelength-dependent atmospheric transmission characteristics when the atmospheric optical telecommunication is used together with another atmospheric optical telecommunication unit to form an atmospheric optical telecommunication system in which the atmospheric optical telecommunication units communicate with one another using light propagated through the atmosphere, the atmospheric telecommunication unit including an optical transmitter having a laser generating a transmitted light beam for reception by the other atmospheric optical telecommunications unit, the transmitted light beam having a wavelength, and an optical receiver, the optical receiver generating an electrical signal in response to a received light beam received from the other atmospheric optical telecommunication unit, the circuit comprising:

detecting means for detecting, in the electrical signal, an increase in noise above a normal noise level and for generating a flag signal in response thereto, the increase in noise being due to the received light beam having a wavelength at which the atmosphere has a wavelength-dependent transmission characteristic; and wavelength changing means, operating in response to the flag signal, for changing the wavelength of the transmitted light beam to a wavelength at which the transmission characteristic of the atmosphere is less wavelength-dependent, wherein:
   the received light beam is modulated with an information signal having a carrier frequency; and
   the detecting means includes means for measuring a level in the electrical signal at a frequency less than the carrier frequency.

27. Atmospheric optical telecommunication apparatus for use in an atmospheric optical telecommunication system in which the atmospheric optical telecommunication apparatus and another atmospheric optical telecommunication apparatus communicate with one another using light propagated through the atmosphere, the atmospheric optical telecommunication apparatus having a reduced susceptibility to effects arising from wavelength-dependent atmospheric transmission characteristics, and comprising:

an optical transmitter including laser means for generating a transmitted light beam for reception by the other of the atmospheric optical telecommunications units, the transmitted light beam having a wavelength, the transmitted light beam being modulated in accordance with an information signal;

optical receiver means for generating an electrical signal in response to a received light beam received from the other atmospheric optical telecommunication unit;

detecting means for detecting, in the electrical signal generated by the optical receiver means, an increase in noise above a normal noise level and for generating a flag signal in response thereto, the increase in noise being due to the received light beam having a wavelength at which the atmosphere has a wavelength-dependent transmission characteristic; and wavelength changing means, operating in response to the flag signal, for changing the wavelength of the modulated transmitted light beam to a wavelength at which the transmission characteristic of the atmosphere is less wave length-dependent.

28. Atmospheric optical telecommunication apparatus for use in an atmospheric optical telecommunication system in which the atmospheric optical telecommunication apparatus and another atmospheric optical telecommunication apparatus communicate with one another using light propagated through the atmosphere, the atmospheric optical telecommunication apparatus having a reduced susceptibility to effects arising from wavelength-dependent atmospheric transmission characteristics, and comprising:

an optical transmitter including laser means for generating a transmitted light beam for reception by the other of the atmospheric optical telecommunications units, the transmitted light beam having a wavelength;

optical receiver means for generating an electrical signal in response to a received light beam received from the other atmospheric optical telecommunication unit;

detecting means for detecting, in the electrical signal generated by the optical receiver means, an increase in noise above a normal noise level and for generating a flag signal in response thereto, the increase in noise being due to the received light beam having a wavelength at which the atmosphere has a wavelength-dependent transmission characteristic; and wavelength changing means, operating in response to the flag signal, for changing the wavelength of the transmitted light beam to a wavelength at which the transmission characteristic of the atmosphere is less wavelength-dependent, wherein:

the apparatus additionally comprises:
   modulating means, operating in response to the flag signal, for modulating the laser means with a first signal component to transmit the flag signal, and
   demodulating means for extracting a second signal component from the electrical signal; and
the wavelength changing means operates in response to the second signal component from the demodulating means in lieu of the flag signal.

29. Atmospheric optical telecommunication apparatus for use in an atmospheric optical telecommunication system in which the atmospheric optical telecommunication apparatus and another atmospheric optical telecommunication apparatus communicate with one another using light propagated through the atmosphere, the atmospheric optical telecommunication apparatus having a reduced susceptibility to effects arising from wavelength-dependent atmospheric transmission characteristics, and comprising:

an optical transmitter including laser means for generating a transmitted light beam for reception by the other of the atmospheric optical telecommunications units, the transmitted light beam having a wavelength;

optical receiver means for generating an electrical signal in response to a received light beam received from the other atmospheric optical telecommunication unit;

detecting means for detecting, in the electrical signal generated by the optical receiver means, an increase in noise above a normal noise level and for generating a flag signal in response thereto, the increase in noise being due to the received light beam having a wavelength at which the atmosphere has a wavelength-dependent transmission characteristic; and wavelength changing means, operating in response to the flag signal, for changing the wavelength of the transmitted light beam to a wavelength at which the transmission characteristic of the atmosphere is less wavelength-dependent, wherein:
the laser means includes a laser diode having an operating temperature; and
the wavelength changing means includes temperature changing means for changing the operating temperature of the laser diode in response to the flag signal.

30. Atmospheric optical telecommunication apparatus for use in an atmospheric optical telecommunication system in which the atmospheric optical telecommunication apparatus and another atmospheric optical telecommunication apparatus communicate with one another using light propagated through the atmosphere, the atmospheric optical telecommunication apparatus having a reduced susceptibility to effects arising from wavelength-dependent atmospheric transmission characteristics, and comprising:

an optical transmitter including laser means for generating a transmitted light beam for reception by the other of the atmospheric optical telecommunications units, the transmitted light beam having a wavelength:

optical receiver means for generating an electrical signal in response to a received light beam received from the other atmospheric optical telecommunication unit;

detecting means for detecting, in the electrical signal generated by the optical receiver means, an increase in noise above a normal noise level and for generating a flag signal in response thereto, the increase in noise being due to the received light beam having a wavelength at which the atmosphere has a wavelength-dependent transmission characteristic and wavelength changing means, operating in response to the flag signal, for changing the wavelength of the transmitted light beam to a wavelength at which the transmission characteristic of the atmosphere is less wavelength-dependent, wherein:
the apparatus additionally includes means for monitoring temporal changes in the operating temperature of the laser diode to generate temporal temperature change information; and
the temperature changing means includes means for determining a direction of change of the operating temperature of the laser diode using the temporal temperature change information.

31. The apparatus of claim 30, wherein:
the apparatus additionally comprises:
modulating means, operating in response to the flag signal, for modulating the laser diode with a first signal component to transmit the flag signal, and
demodulating means for extracting a second signal component from the electrical signal: and the temperature changing means operates in response to the second signal component from the demodulating means in lieu of the flag signal.

32. Atmospheric optical telecommunication apparatus for use in an atmospheric optical telecommunication system in which the atmospheric optical telecommunication apparatus and another atmospheric optical telecommunication apparatus communicate with one another using light propagated through the atmosphere, the atmospheric optical telecommunication apparatus having a reduced susceptibility to effects arising from wavelength-dependent atmospheric transmission characteristics and comprising:

an optical transmitter including laser means for generating a transmitted light beam for reception by the other of the atmospheric optical telecommunications units, the transmitted light beam having a wavelength;

optical receiver means for generating an electrical signal in response to a received light beam received from the other atmospheric optical telecommunication unit;

detecting means for detecting, in the electrical signal generated by the optical receiver means, an increase in noise above a normal noise level and for generating a flag signal in response thereto, the increase in noise being due to the received light beam having a wavelength at which the atmosphere has a wavelength-dependent transmission characteristic; and wavelength changing means, operating in response to the flag signal, for changing the wavelength of the transmitted light beam to a wavelength at which the transmission characteristic of the atmosphere is less wavelength-dependent, wherein:
the laser means includes a laser diode operating at a DC bias current; and
the wavelength changing means includes current changing means for changing the DC bias current of the laser diode in response to the flag signal.

33. The apparatus of claim 32, wherein:
the apparatus additionally comprises:
modulating means, operating in response to the flag signal, for modulating the laser diode with a first signal component to transmit the flag signal, and
demodulating means for extracting a second signal component from the electrical signal; and the current changing means operates in response to the second signal component from the demodulating means in lieu of the flag signal.

34. Atmospheric optical telecommunication apparatus for use in an atmospheric optical telecommunication .system in which the atmospheric optical telecommunication apparatus and another atmospheric optical telecommunication apparatus communicate with one another using light propagated through the atmosphere, the atmospheric optical telecommunication apparatus having a reduced susceptibility to effects arising from wavelength-dependent atmospheric transmission characteristics, and comprising:

an optical transmitter including laser means for generating transmitted light beam for reception by the other of the atmospheric optical telecommunications units, the transmitted light beam having a wavelength;

optical receiver means for generating an electrical signal in response to a received light beam received from the other atmospheric optical telecommunication unit;

detecting means for detecting, in the electrical signal generated by the optical receiver means, an increase in noise above a normal noise level and for generating a flag signal in response thereto, the increase in noise being due to the received light beam having a wavelength at which the atmosphere has a wavelength-dependent transmission characteristic; and wavelength changing means, operating in response to the flag signal, for changing the wavelength of the transmitted light beam to a wavelength at which the transmission characteristic of the atmosphere is less wavelength-dependent, wherein:

the laser means includes a dye laser having an optical resonator; and the wavelength changing means includes re-tuning means for re-tuning the optical resonator in response to the flag signal.

35. The apparatus of claim 34, wherein:

the apparatus additionally comprises:

modulating means, operating in response to the flag signal for modulating the dye laser with a first signal component to transmit the flag signal, and demodulating means for extracting a second signal component from the electrical signal; and the re-tuning means operates in response to the second signal component frown the demodulating means in lieu of the flag signal.

36. Atmospheric optical telecommunication apparatus for use in an atmospheric optical telecommunication system in which the atmospheric optical telecommunication apparatus and another atmospheric optical telecommunication apparatus communicate with one another using light propagated through the atmosphere, the atmospheric optical telecommunication apparatus having a reduced susceptibility to effects arising from wavelength-dependent atmospheric transmission characteristics, and comprising:

an optical transmitter including laser means for generating a transmitted light beam for reception by the other of the atmospheric optical telecommunications units, the transmitted light beam having a wavelength;

optical receiver means for generating an electrical signal in response to a received light beam received from the other atmospheric optical telecommunication unit;

detecting means for detecting, in the electrical signal generated by the optical receiver means, an increase in noise above a normal noise level and for generating a flag signal in response thereto, the increase in noise being due to the received light beam having a wavelength at which the atmosphere has a wavelength-dependent transmission characteristic; and wavelength changing means, operating in response to the flag signal, for changing the wavelength of the transmitted light beam to a wavelength at which the transmission characteristic of the atmosphere is less wavelength-dependent, wherein:

the apparatus additionally includes memory means for storing data representing wavelength-dependent atmospheric transmission characteristics; and the wavelength changing means includes:

means for reading the data representing wavelength-dependent atmospheric transmission characteristics from the memory means in response to the flag signal, and change determining means for determining an amount of change in the wavelength of the transmitted light beam from the data representing wavelength-dependent atmospheric transmission characteristics read from the memory means; and the wavelength changing means changes the wavelength of the transmitted light beam by the amount of change determined by the change determining means.

37. Atmospheric optical telecommunication apparatus for use in an atmospheric optical telecommunication system in which the atmospheric optical telecommunication apparatus and another atmospheric optical telecommunication apparatus communicate with one another using light propagated through the atmosphere, the atmospheric optical telecommunication apparatus having a reduced susceptibility to effects arising from wavelength-dependent atmospheric transmission characteristics, and comprising:

an optical transmitter including laser means tier generating a transmitted light beam for reception by the other of the atmospheric optical telecommunications units, the transmitted light beam having a wavelength;

optical receiver means for generating an electrical signal in response to a received light beam received from the other atmospheric optical telecommunication unit;

detecting means for detecting, in the electrical signal generated by the optical receiver means, an increase in noise above a normal noise level and for generating a flag signal in response thereto, the increase in noise being due to the received light beam having a wavelength at which the atmosphere has a wavelength-dependent transmission characteristic; and wavelength changing means, operating response to the flag signal, for changing the wavelength of the transmitted light beam to a wavelength at which the transmission characteristic of the atmosphere is less wavelength-dependent, wherein:

the received light beam is modulated with an information signal having a carrier frequency; and the detecting means includes means for measuring a level in the electrical signal at a frequency less than the carrier frequency.

\* \* \* \* \*